(12) United States Patent
Weipert et al.

(10) Patent No.: US 8,979,112 B2
(45) Date of Patent: Mar. 17, 2015

(54) ADJUSTABLE HITCH ASSEMBLY

(71) Applicant: Cequent Performance Products, Inc., Plymouth, MI (US)

(72) Inventors: Neal Weipert, Livonia, MI (US); Richard McCoy, Granger, IN (US); Jacob Belinky, Carleton, MI (US)

(73) Assignee: Cequent Performance Products, Inc., Plymouth, MI (US)

( * ) Notice: Subject to any disclaimer, the term of this patent is extended or adjusted under 35 U.S.C. 154(b) by 148 days.

(21) Appl. No.: 13/626,604

(22) Filed: Sep. 25, 2012

(65) Prior Publication Data

US 2013/0020784 A1     Jan. 24, 2013

Related U.S. Application Data

(63) Continuation-in-part of application No. 12/587,179, filed on Oct. 2, 2009.

(60) Provisional application No. 61/194,987, filed on Oct. 2, 2008.

(51) Int. Cl.
| | |
|---|---|
| *B60D 1/14* | (2006.01) |
| *B60D 1/46* | (2006.01) |
| *B60D 1/54* | (2006.01) |
| *B60D 1/07* | (2006.01) |
| *B60D 1/52* | (2006.01) |

(52) U.S. Cl.
CPC .. *B60D 1/07* (2013.01); *B60D 1/46* (2013.01); *B60D 1/52* (2013.01); *B60D 1/54* (2013.01)
USPC ................... 280/491.5; 280/491.3; 280/490.1

(58) Field of Classification Search
USPC ................ 280/405.1, 407, 415, 416.1, 490.1, 280/491.3, 491.5; D12/162
See application file for complete search history.

(56) References Cited

U.S. PATENT DOCUMENTS

| | | | |
|---|---|---|---|
| 2,823,930 A | | 2/1958 | Cooper |
| 2,847,232 A | * | 8/1958 | Graham ..................... 280/490.1 |
| 3,400,949 A | | 9/1968 | Kendall |
| 3,922,006 A | | 11/1975 | Borges |
| 4,248,450 A | | 2/1981 | McWethy |
| 4,662,647 A | | 5/1987 | Calvert |
| 5,413,366 A | * | 5/1995 | Gibbons .................... 280/490.1 |
| 5,725,229 A | | 3/1998 | McWethy |
| D397,067 S | | 8/1998 | McCoy et al. |
| 5,839,744 A | | 11/1998 | Marks |
| 5,873,594 A | | 2/1999 | McCoy et al. |
| 5,890,727 A | | 4/1999 | May |

(Continued)

*Primary Examiner* — Joseph Rocca
*Assistant Examiner* — Daniel Yeagley
(74) *Attorney, Agent, or Firm* — McDonald Hopkins LLC; Jeff Urian

(57) ABSTRACT

The present invention is directed to an adjustable hitch assembly for coupling a towed vehicle with a towing vehicle. An embodiment of the adjustable hitch assembly may include a base member, a ball support member, and a hitch ball member. The base member may include a connecting portion and a shank member, wherein the shank member may extends perpendicularly away from the connecting portion. The ball support member may include a support rod extending perpendicularly away from the shank member. The ball support member may also include an opening there though that may be attached to the shank member. The hitch ball member may be attached to the support rod, wherein the hitch ball member may have at least one accessory aperture. The connecting portion may be attached to the towing vehicle and the hitch ball member may be attached to the towed vehicle.

29 Claims, 22 Drawing Sheets

(56) References Cited

U.S. PATENT DOCUMENTS

| | | |
|---|---|---|
| 6,068,281 A | 5/2000 | Szczypski |
| 6,116,631 A | 9/2000 | Logan et al. |
| 6,460,870 B2 | 10/2002 | Moss |
| 6,575,488 B2 | 6/2003 | Massey |
| 6,712,381 B1 | 3/2004 | Moss |
| 6,726,237 B1 | 4/2004 | Carrico |
| 6,789,815 B2 | 9/2004 | Moss et al. |
| 6,824,156 B2 | 11/2004 | Smith |
| 6,902,181 B1 | 6/2005 | Dye |
| 6,908,099 B2 | 6/2005 | Andersen |
| D508,221 S * | 8/2005 | Rebick .................. D12/162 |
| 6,932,375 B2 | 8/2005 | Zahn |
| 6,974,148 B2 | 12/2005 | Moss et al. |
| 7,004,492 B2 | 2/2006 | Moss et al. |
| 7,021,643 B1 | 4/2006 | Buchanan |
| 7,029,022 B2 | 4/2006 | Moss |
| 7,081,197 B1 | 7/2006 | Davis |
| 7,125,036 B2 | 10/2006 | Moss et al. |
| 7,156,412 B2 | 1/2007 | Andersen |
| 7,185,904 B1 | 3/2007 | Jones et al. |
| 7,204,505 B2 | 4/2007 | Moss |
| 7,222,510 B2 | 5/2007 | Andersen |
| D553,058 S | 10/2007 | Chen et al. |
| D629,338 S | 12/2010 | Ceccarelli et al. |
| 7,850,192 B2 | 12/2010 | Ceccarelli et al. |
| 8,033,563 B2 | 10/2011 | Good |
| 2010/0127479 A1 | 5/2010 | Weipert et al. |
| 2012/0217724 A1* | 8/2012 | Works .................. 280/490.1 |

* cited by examiner

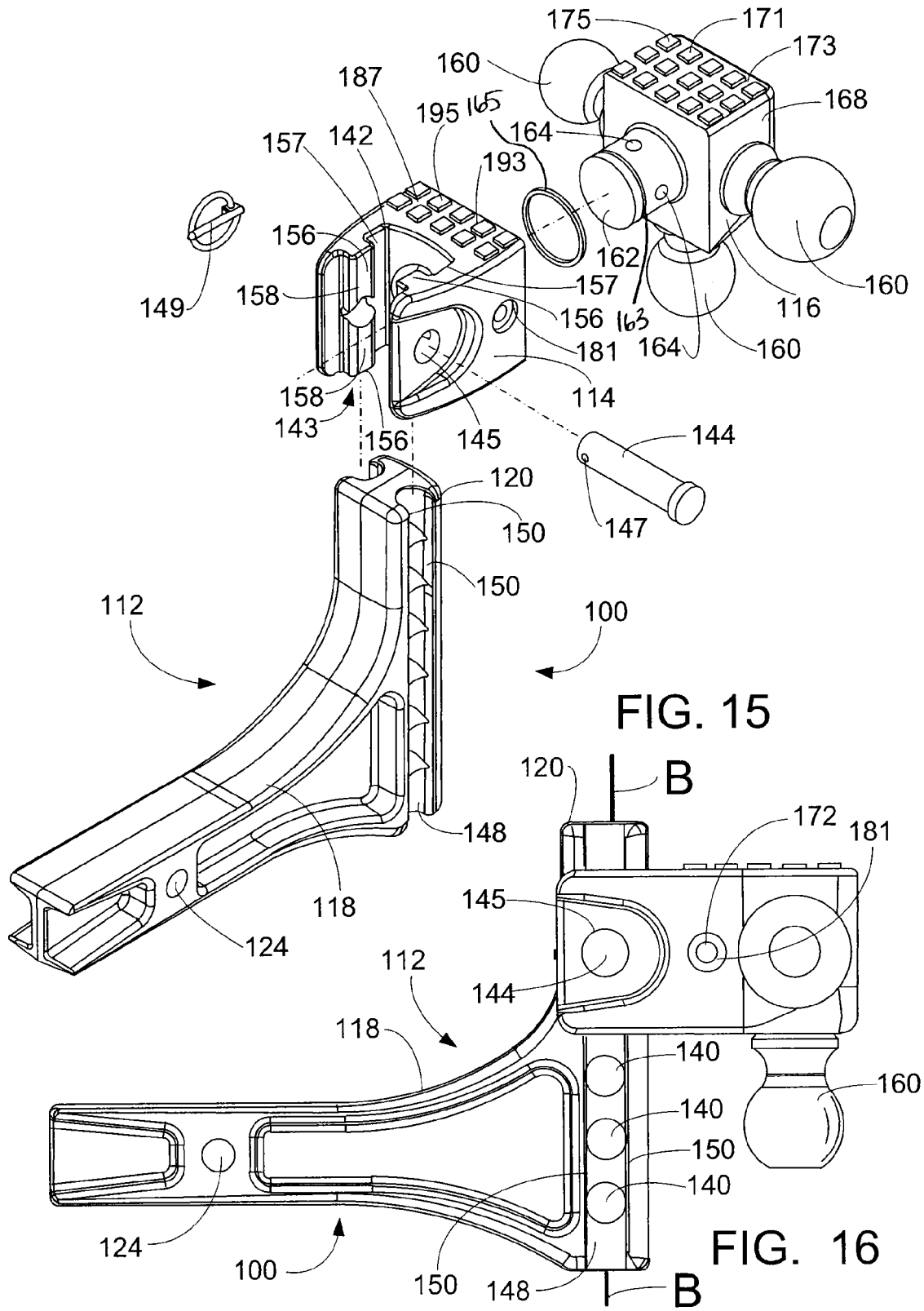

ADJUSTABLE HITCH ASSEMBLY

CROSS-REFERENCE TO RELATED APPLICATION

This application is a continuation-in-part of U.S. patent application Ser. No. 12/587,179 filed on Oct. 2, 2009, which claims the benefit of U.S. Provisional Patent Application No. 61/194,987, entitled "Adjustable Hitch Assembly," filed on Oct. 2, 2008, which is hereby incorporated in its entirety by reference.

FIELD OF INVENTION

The present invention relates generally to a towing apparatus, and more particularly, to an improved trailer hitch assembly.

BACKGROUND

For many years, trailers have been used to transport goods from place to place. Generally, trailers do not have an independent source of power, and therefore, must be coupled with a powered form of transportation. Long ago, trailers such as wagons or carriages were coupled to horses by connecting the trailer to the horse's harness. More recently, trailers are connected to motorized vehicles such as cars, trucks and the like.

Many methods and devices have been developed for connecting trailers to vehicles. Such devices include receiver hitches (e.g. pin hitches and ball hitches), gooseneck hitches, fifth wheel hitches, and other types of commonly known hitches. Typical receiving hitches often include a receiving member connected to a vehicle, a ball or pin member connected to the receiving member, and a coupler member connected to the trailer and engaged with the ball member.

FIG. 1 illustrates a prior art version of a receiver hitch 30. The receiver hitch 30 includes a ball member 32 that may be connected to an adjustable member 34. The adjustable member 34 is pinned to a base 36. To adjust the height of the ball member 32, the pins must be removed and the adjustable member 34 may then be aligned with different pinholes. The pins may then be reinserted.

While receiver hitches similar to the receiver hitch 30 illustrated in FIG. 1 may be effective devices for connecting a trailer to a vehicle, problems exists with these designs. The prior art hitches include parts that must be removed in order to adjust the height of the hitch ball or move the hitch ball into a storage position. In addition, loose parts can be lost or allow for theft of the hitch components. The prior art hitches also require tools to change the hitch ball from one size to another. Therefore, there is a need in the art for an improved and easier to use adjustable ballmount hitch to overcome these and other disadvantages.

DESCRIPTION OF THE DRAWINGS

Objects and advantages together with the operation of the invention may be better understood by reference to the following detailed description taken in connection with the following illustrations, wherein:

FIG. 15 illustrates an exploded view of embodiments of an adjustable hitch assembly.

FIG. 16 illustrates a side view of the adjustable hitch assembly of FIG. 15.

SUMMARY OF INVENTION

The present invention is directed to an adjustable hitch assembly for coupling a towed vehicle with a towing vehicle. An embodiment of the adjustable hitch assembly may include a base member, a ball support member, and a hitch ball member. The base member may include a connecting portion and a shank member, wherein the shank member may extends perpendicularly away from the connecting portion. The ball support member may include a support rod extending perpendicularly away from the shank member. The ball support member may also include an opening there though that may be attached to the shank member. The hitch ball member may be attached to the support rod, wherein the hitch ball member may have at least one accessory aperture. The connecting portion may be attached to the towing vehicle and the hitch ball member may be attached to the towed vehicle.

An adjustable hitch assembly may include a vehicle attachment member capable of selective engagement with a towing vehicle, a shank extending from the vehicle attachment member, the shank having a length, and a guide member positioned in and extending at least a portion of the length of the shank. The adjustable hitch assembly may also include a support member selectively secured with the shank, and an engaging member integrally formed with the support member, where the engaging member is capable of matingly engaging with the guide member.

An adjustable hitch assembly may include a vehicle attachment member, a shank extending from and connected with the vehicle attachment member, the shank having a length, and a guide member positioned in and extending at least a portion of the length of the shank. The adjustable hitch assembly may also include a support member selectively attached to the shank, the support member having a height, and an engaging member attached to the support member and extending substantially the height of the support member, where the engaging member engages with the guide member upon selective attachment of the support member with the shank.

An adjustable hitch assembly may include a vehicle attachment member, a shank extending from and connected with the vehicle attachment member, the shank having a length, a guide member positioned on and extending the length of the shank, the guide member having first and second ends. The adjustable hitch assembly may also include a support member selectively attached to the shank, and an engaging member attached with the support member, where the support member is removable from the shank at both of the first and second ends of the guide member.

DETAILED DESCRIPTION

Figure 1:
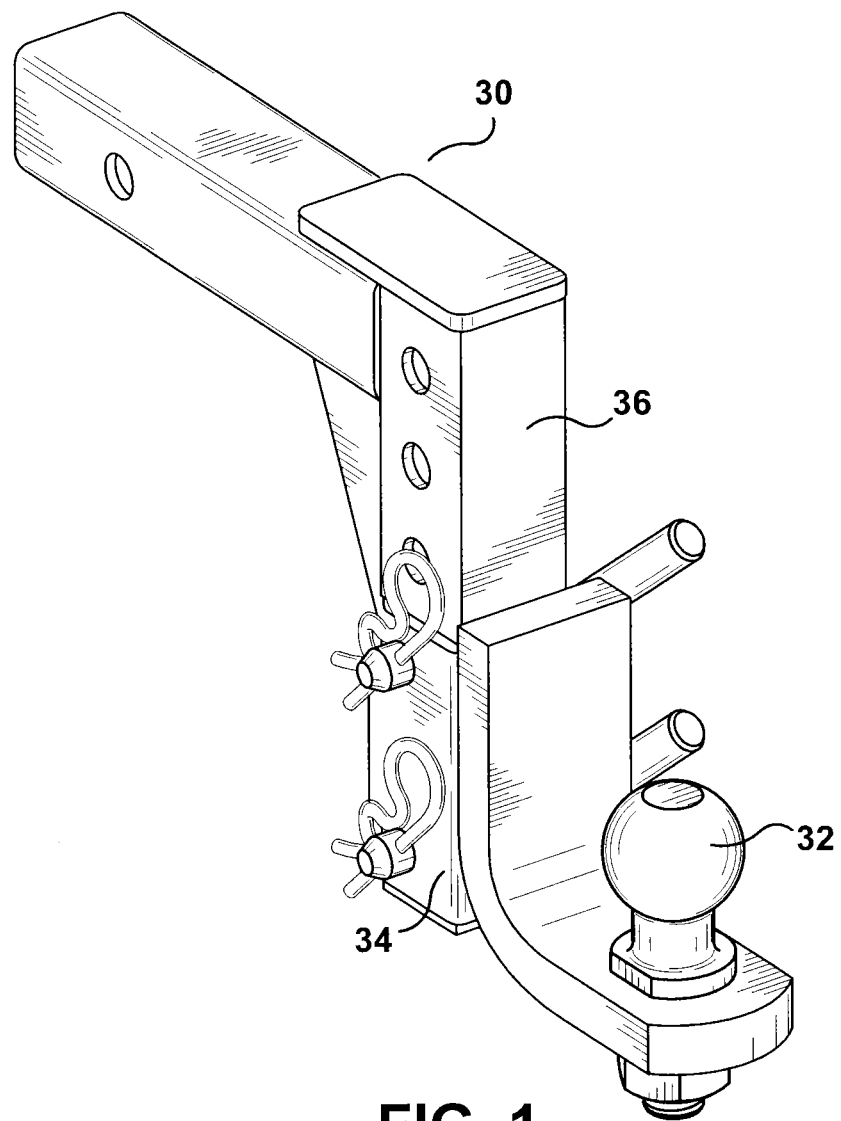
FIG. 1 illustrates a perspective view of a prior art hitch assembly.
Figure 2:
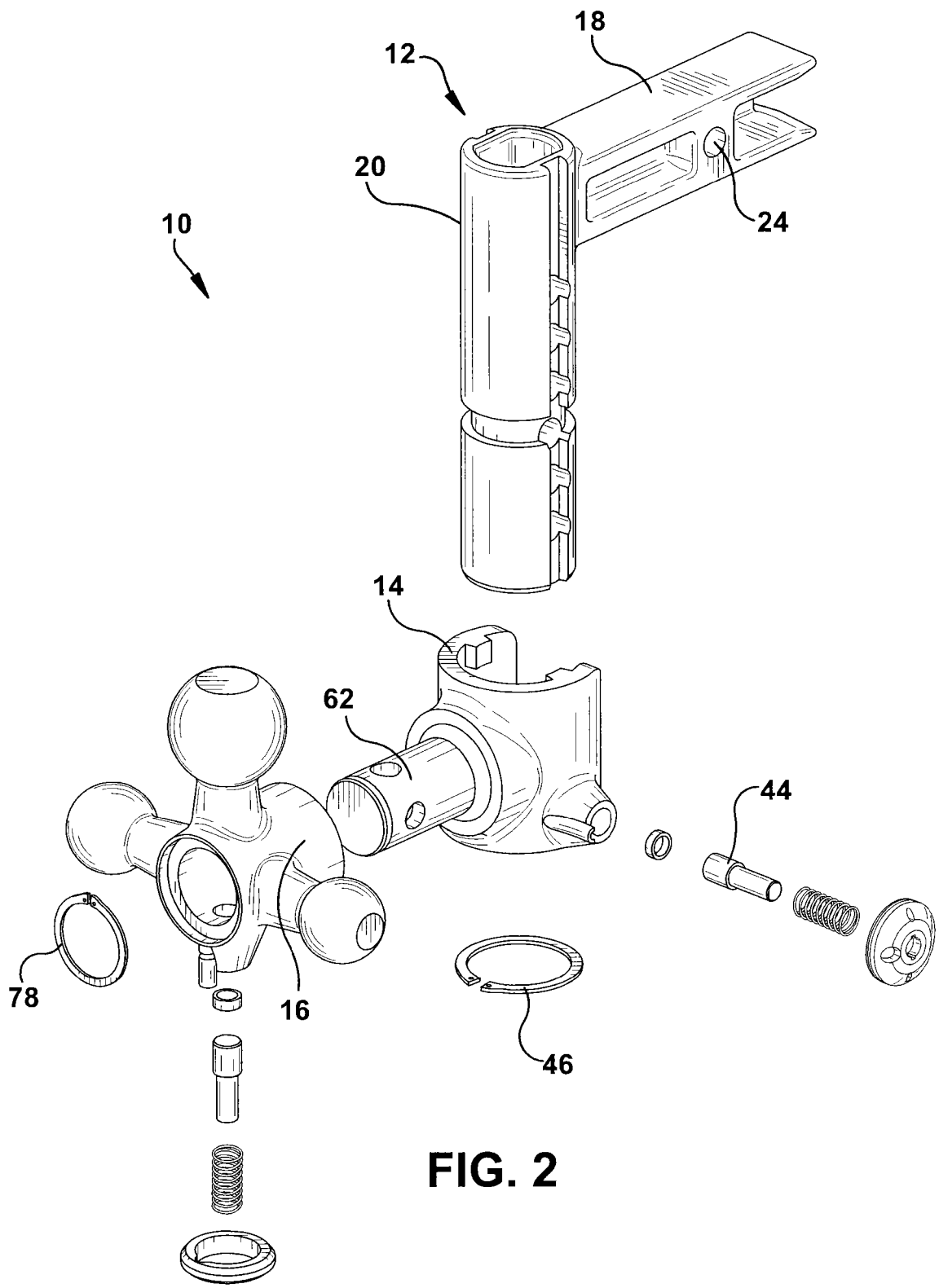
FIG. 2 illustrates an exploded view of an embodiment of an adjustable hitch assembly.
Figure 3:
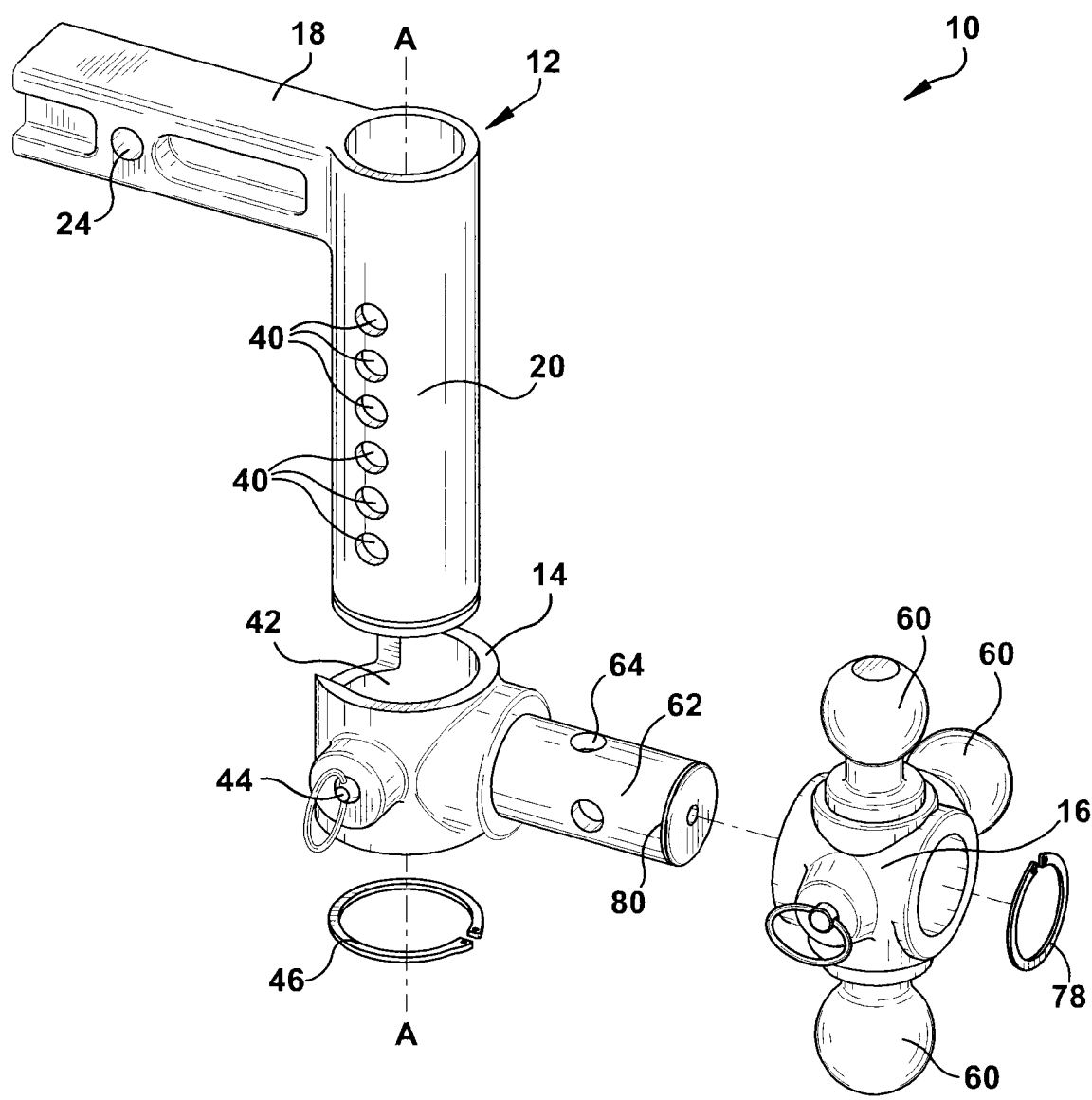
FIG. 3 illustrates another exploded view of an embodiment of the adjustable hitch assembly.

The present invention relates to an adjustable hitch assembly 10 for connecting a trailer to a vehicle. Unlike the prior art, the adjustable hitch assembly 10 may utilize a heavy duty ball mount system rated at 12,000 lbs that may allow for vertical adjustment, choice of hitch ball sizes, and the ability to store the hitch balls in an out of the way storage position without having to remove pins or use tools. As illustrated in FIGS. 2 and 3, an adjustable hitch assembly 10 may include a base member 12, a ball support member 14, and a hitch ball member 16. The hitch assembly 10 may connect to a vehicle and a trailer, thereby linking the trailer to the vehicle.

The base member 12 may include a connecting portion 18 and a shank member 20. The connecting portion 18 may be connected to the shank member 20. In one embodiment, the connecting portion 18 may extend perpendicularly from one end of the shank member 20. While FIGS. 2 and 3 illustrate the connecting portion 18 extending perpendicularly from the shank member 20, the connecting portion 18 and shank member 20 may also be arranged in alternate configurations.

Figure 4:
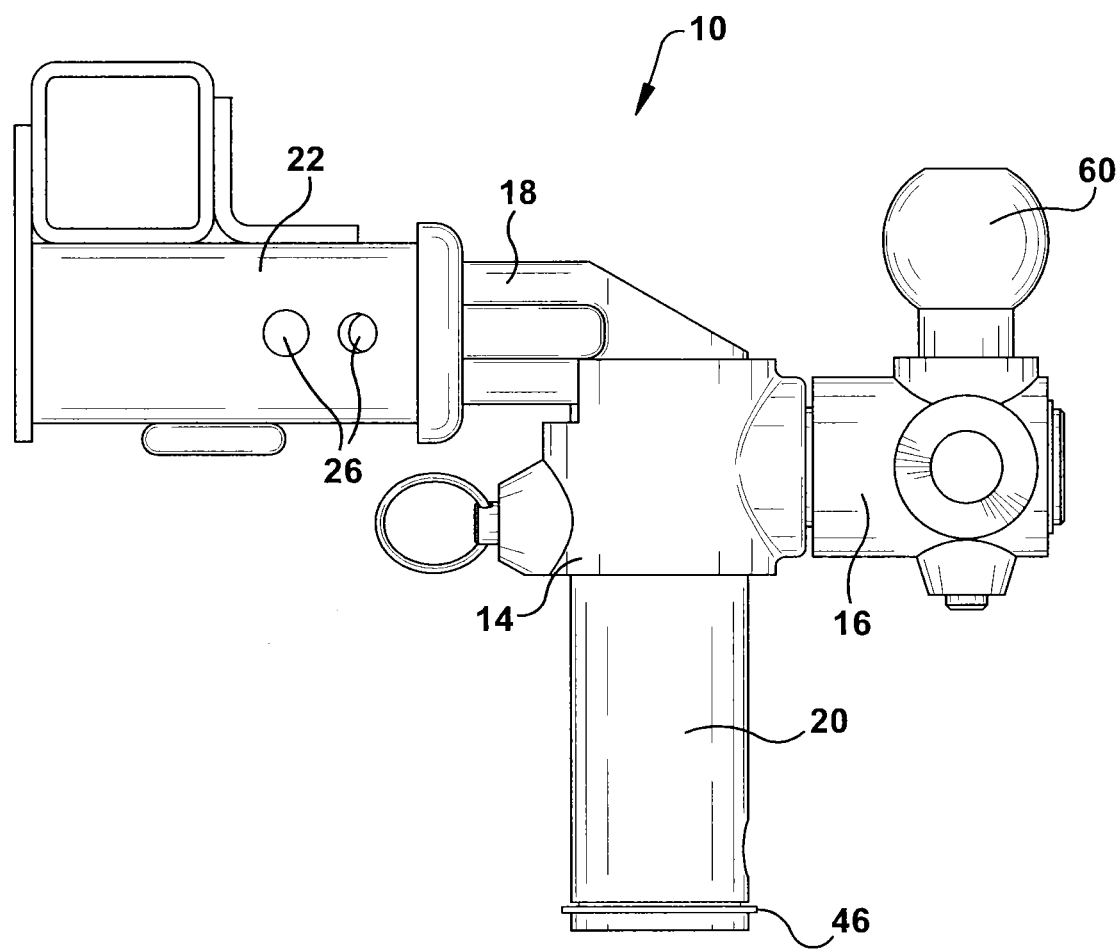
FIG. 4 illustrates a side view of an embodiment of the adjustable hitch assembly connected to a receiving member.

The connecting portion 18 may connect to a vehicle. In one example, the connecting portion 18 may connect to a receiving member 22 mounted to a vehicle, as illustrated in FIG. 4. The receiving member 22 may have an opening (not shown) sized and shaped similar to that of the connecting portion 18, whereby it is configured to receive the connecting portion 18. The receiving member 22 may be attached to the vehicle by any appropriate means, such as by being welded to the frame of the vehicle, secured under the bumper of the vehicle, or connected to the vehicle by other means commonly known to those skilled in the art.

The receiving member 22 may have one or more connecting apertures 26. The connecting apertures 26 may secure the connecting portion 18 to the receiving member 22. The connecting portion 18 may include a pinhole 24. The pinhole 24 may be configured to align with the connecting holes 26 in the receiving member 22 when the connecting portion 18 is inserted into the receiving member 22. When the holes 26, 24 are aligned, the connecting portion 18 may be secured in place by inserting a pin (not shown) through holes 24, 26.

As illustrated in FIG. 3, the shank member 20 may extend perpendicularly from one end of the connecting portion 18. The shank member 20 may be shaped and sized to engage the ball support member 14. In one embodiment, the shank member 20 may be substantially cylindrical in shape, having an axis A-A defined by the center points of the cylinder. By using a round vertical post for the shank member 20 the adjustable hitch assembly 10 may be easily rotated into the storage position.

The shank member 20 may include at least one opening 40 along its surface. As illustrated in FIG. 3, the shank member 20 may have a hollow interior with the at least one opening 40 extending through the surface of the shank member 20. In one embodiment shown in FIG. 3, the shank member 20 may include a plurality of openings 40 arranged linearly along the surface of the shank member 20, and a corresponding set of openings (not shown) located on the opposite side of the shank member 20, whereby the openings may be arranged similar to the first plurality of openings 40 and located 180 degrees opposite the first plurality of openings 40. While FIG. 3 illustrates a plurality of openings 40 aligned linearly, it should be appreciated that the shank member 20 may include any number of openings 40 arranged in any configuration.

The ball support member 14 may include an opening 42. The opening 42 may be sized and shaped to receive the shank member 20. In one embodiment, the opening 42 may be of a substantially cylindrical shape. When the shank member 20 is inserted into the opening 42, as shown in FIG. 5A, the ball support member 14 may be movable along the axis A-A and rotatable about the axis A-A.

The adjustable hitch assembly 10 may be configured to prevent the ball support member 14 from sliding off of the shank member 20. At one end of the shank member 20, the connecting portion 18 may prevent the ball support member 14 from sliding off, as illustrated in FIGS. 2 and 3. At the other end of the shank member 20, a snap ring 46 may be connected to a groove 38 located at an end of the shank member 20 to prevent the ball support member 14 from sliding off of that end, as shown in FIGS. 2-4. Alternatively, any other appropriate means may be used to prevent the ball support member 14 from sliding off either end of the shank member 20.

The ball support member 14 may also include at least one pin member 44. The pin member 44 may be connected to a side of the ball support member 14. The pin member 44 may be removable from the ball support member 14, or fixably connected to the ball support member 14. The pin member 44 may extend into the opening 42. In one embodiment, the pin member 44 may be a spring-loaded integral lock pin that may be fixed to the ball support member 14. The spring-loaded pin 44 may be biased toward the center of the opening 42. In addition, there aren't any pins or clips to remove and lose due to the built-in spring loaded lock pin 44 feature. While FIG. 5 illustrates a ball support member 14 with one pin member 44, the ball support member 14 may include more than one pin member 44. In an embodiment, the ball support member may include two pin members 44 arranged 180 degrees opposite to each other.

Figure 5A:
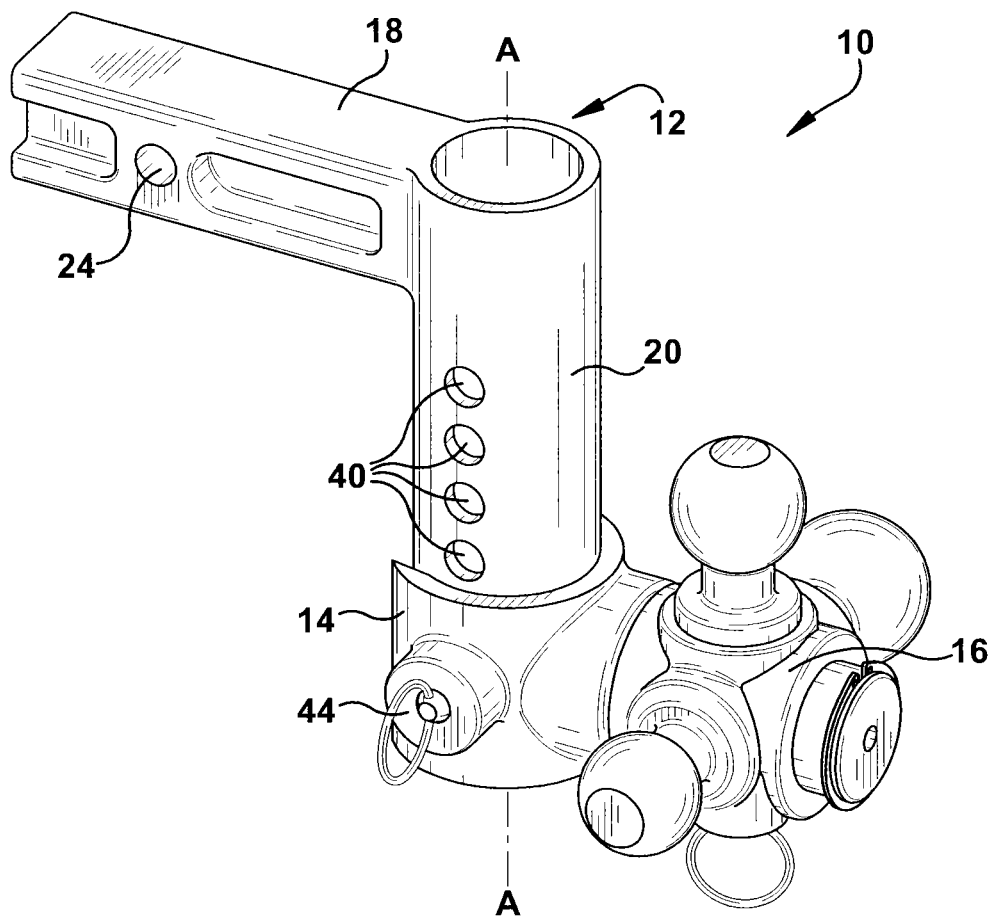
FIG. 5A illustrates a perspective view of an embodiment of the adjustable hitch assembly in a first position.
Figure 5B:
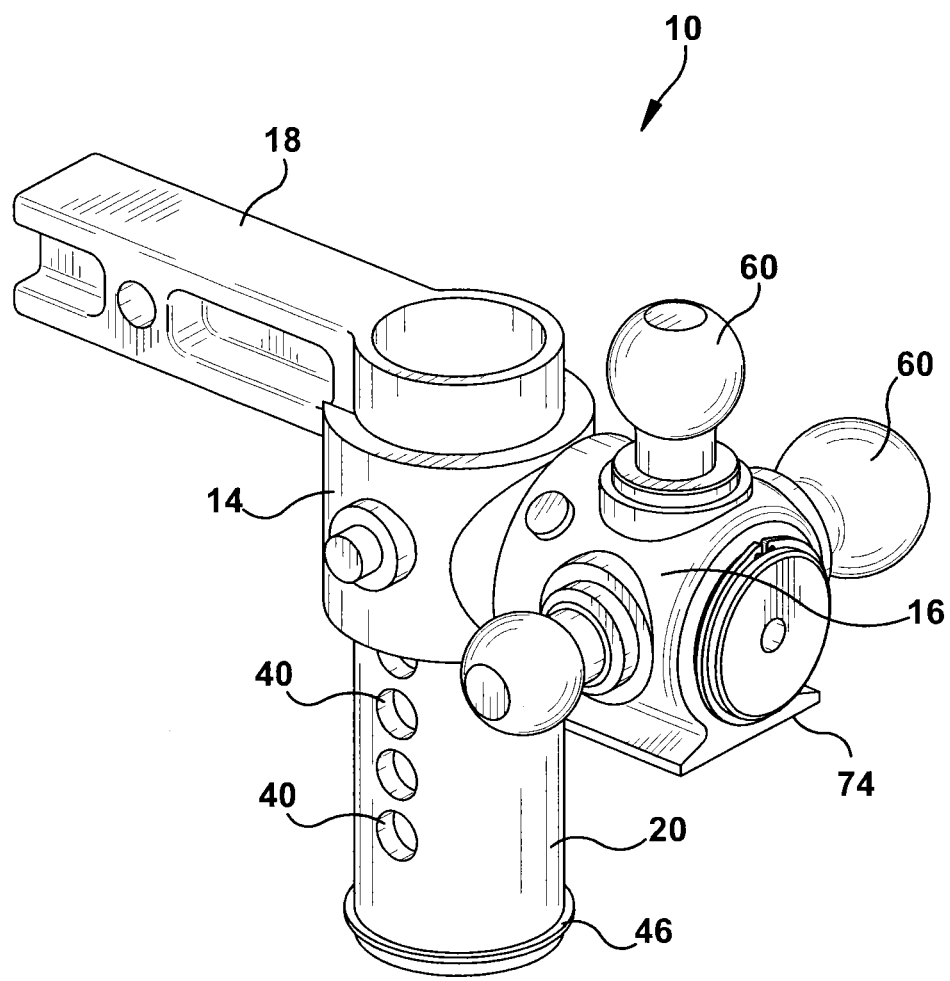
FIG. 5B illustrates a perspective view of an embodiment of the adjustable hitch assembly in a second position.

The ball support member 14 may be secured into place on the shank member 20 by aligning the pin member 44 with the desired opening 40 at the desired height and location along the shank member 20, as shown in FIGS. 5A and 5B. The pin member 44 may be inserted into the selected opening 40 to lock the ball support member 14 in place, thereby preventing the ball support member 14 from moving along the axis A-A or rotating about the axis A-A.

Figure 6:
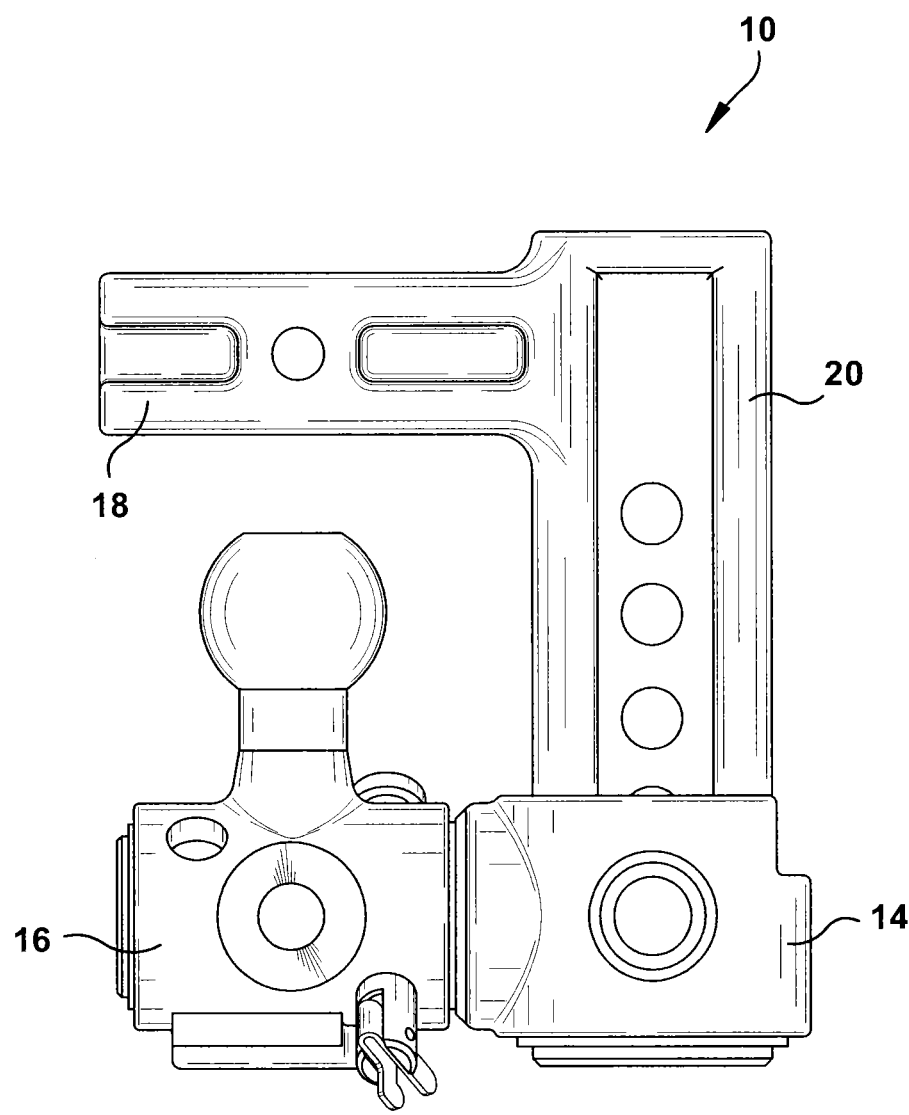
FIG. 6 illustrates a side view of an embodiment of the adjustable hitch assembly in a storage position.

The ball support member 14 may be configured to a towing position, where the hitch ball member 16 may extend away from the connecting member 18, as shown in FIGS. 5A and 5B. To store the hitch ball member 16, the ball support member 14 may be rotated into a storage position, as shown in FIG. 6. To move the ball support member 14 from a towing position to a storage position, the pin member 44 may be removed from the opening 40 in the shank member 20. The ball support member 14 may be rotated about the axis A-A approximately 180 degrees and moved along the axis A-A, such that the pin member 44 may be aligned with a second opening (not shown), approximately 180 degrees opposite the first opening 40. The pin member 44 may be inserted into the second opening, securing the ball support member 14 into the storage position.

Figure 7:
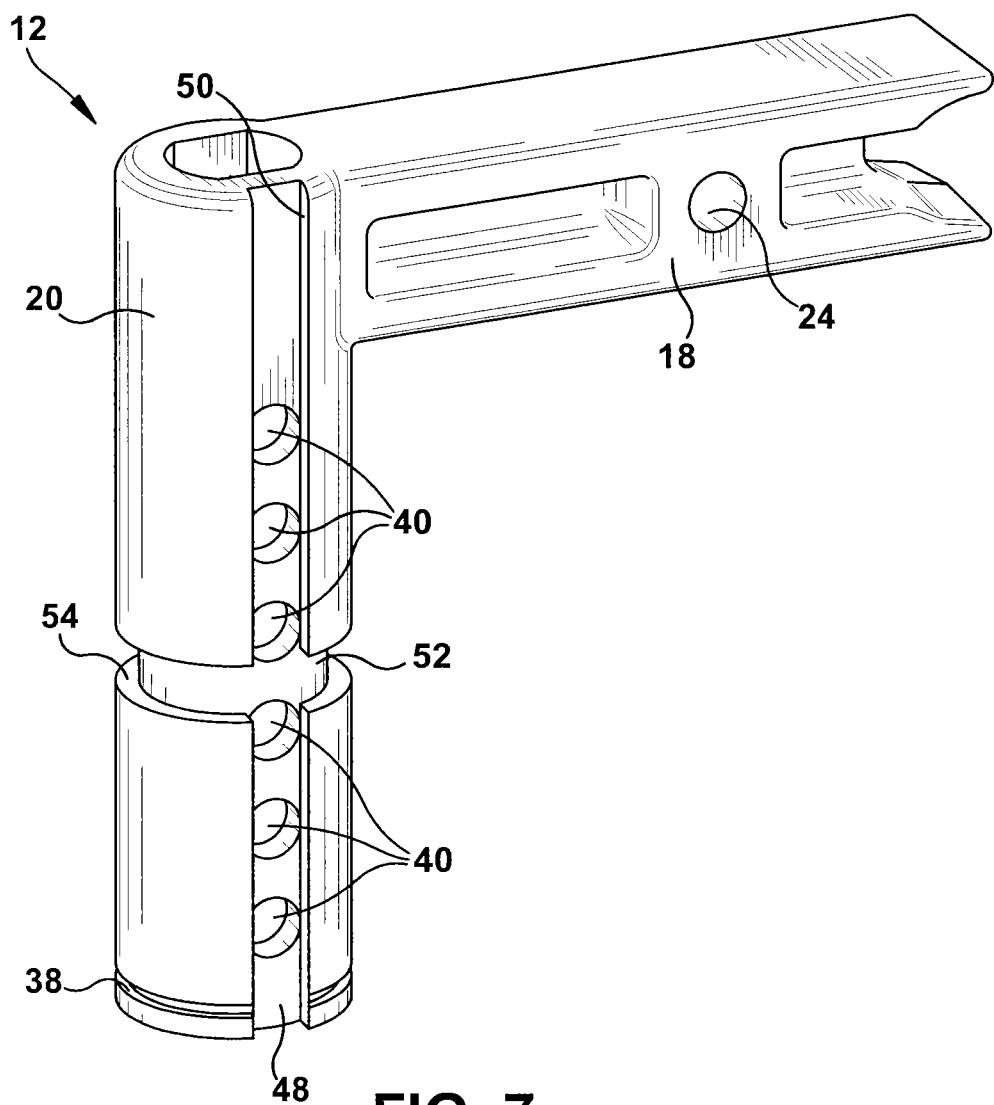
FIG. 7 illustrates a perspective view of a base member of the adjustable hitch assembly.

In one embodiment, the shank member 20 may include one or more guiding slots 48, as shown in FIG. 7. The guiding slot 48 may consist of a recessed area in the outer surface of the shank member 20, formed between two inner sidewalls 50. The inner sidewalls 50 may be substantially parallel to the axis A-A.

The shank member 20 may also include at least one rotating slot 52, as shown in FIG. 7. The rotating slot 52 may consist of a recessed area in the outer surface of the shank member 20, formed between two inner sidewalls 54. The inner sidewalls 54 may be substantially parallel to each other. The rotating slot 52 and the corresponding inner sidewalls 54 may extend around the outer circumference of the shank member 20. The horizontal and vertical inner sidewalls 50, 54 may be discontinuous, with a break in the wall where the guiding slot 48 and the rotating slot 52 intersect. While FIG. 7 shows the openings 40 located within the guiding slot 48, the openings may also be located at any other position on the surface of the adjustable member 20.

Figure 8:
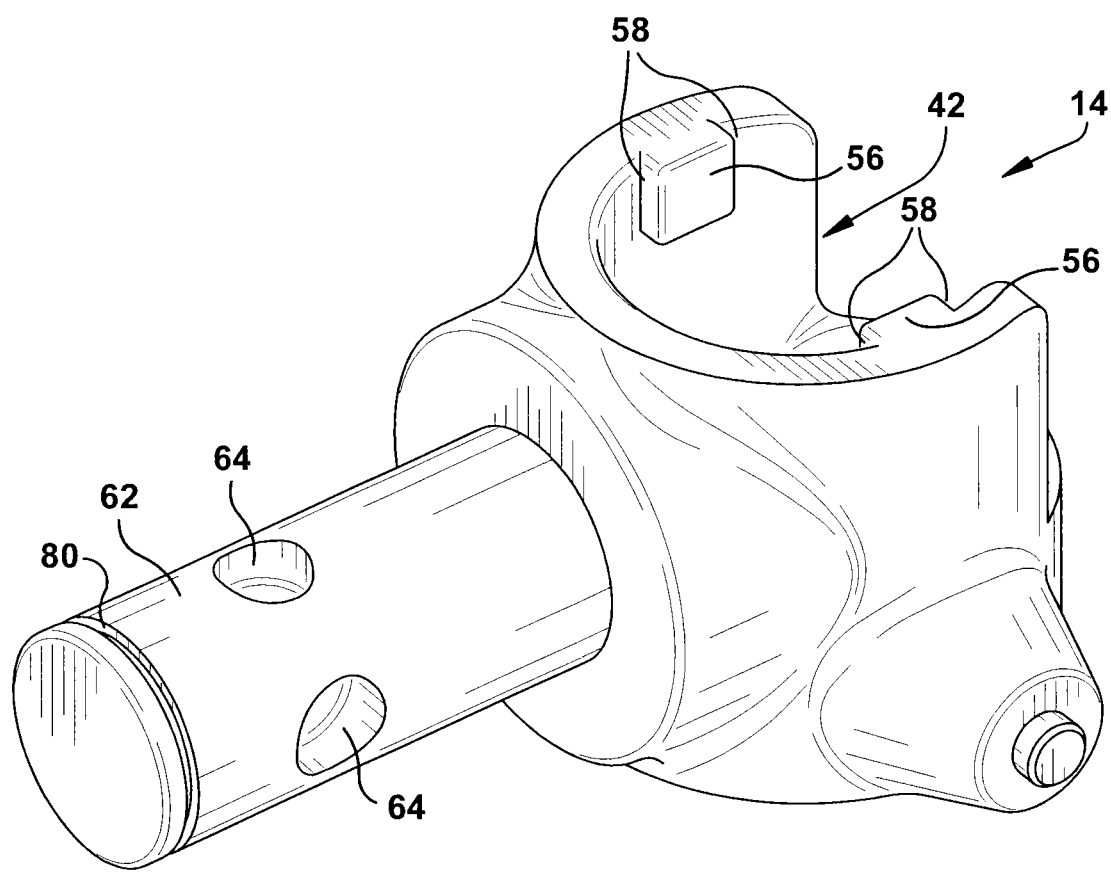
FIG. 8 illustrates a perspective view of the ball support member of the adjustable hitch assembly.

FIG. 8 illustrates the ball support member 14. The ball support member 14 may include at least one key 56, located on an interior surface of the opening 42 of the ball support member 14. The key 56 may include outer sidewalls 58 that may extend into the opening 42, as shown in FIG. 8. There may be two keys 56 located within the opening 42. While the two keys 56 are shown being located opposite of one another, it is understood that they may be located at any appropriate position in the ball support member 14, such that they may correspond to the location(s) of the guiding slot(s) 48 on the shank member 20.

The size and shape of each key 56 may correspond to the size and shape of the guiding and rotating slots 48, 52, such that the key 56 may move within the guiding and rotating slots 48, 52. The round vertical shank member 20 allows the hitch ball member to slide and adjust easily up and down the post with a key 56 in groove 48, 52 feature to keep the components aligned while adjusting the height or location of the hitch assembly 10. By way of example, the guiding slot 48 may have a width W between the inner sidewalls 50 and a depth D. The rotating slot 52 may have a height H between the inner sidewalls 54 and a depth D. The key 56 may then have a width slightly less than W, a height slightly less than H, and a depth slightly less than D.

When the shank member 20 is inserted into the opening 42 in the ball support member 14, the key 56 may be aligned with the guiding slot 48 and may fit inside the guiding slot 48 and the rotating slot 52. The ball support member 14 may then be movable along the paths of the guiding slot 48 and the rotating slot 52 to position the ball support member 14 at the desired location. While FIG. 8 illustrates a ball support member 14 having two keys 56, it should be appreciated that a ball support member 14 may have one or any number of keys 56.

As illustrated in FIG. 8, the ball support member 14 may also include a support rod 62. The support rod 62 may be integrally formed in the ball support member 14, or may be removably connected to the ball support member 14 by any appropriate means, such as fasteners, welding or the like. The support rod 62 may include at least one aperture 64 located on the surface of the support rod 62. While shown as having more than one aperture 64 located radially around the support 62, it is to be understood that the support rod 62 may have any number of apertures 64 located at any appropriate location on the support rod 62.

The support rod 62 may be shaped and sized to engage a similarly shaped opening 66 located in the hitch ball member 16. While FIG. 8 illustrates a cylindrically shaped support rod 62, it is to be understood that the support rod 62 may be of any appropriate shape or size, such as correspondingly shaped and size to fit within the opening 66 in the hitch ball member 16. The support rod 62 may also include a groove 80 located at an end. A snap ring 46 may be connected to the groove 80 located at an end of the support rod 62 to prevent the hitch ball member 16 from sliding off of that end, as best shown in FIGS. 3 and 5A.

Figure 9:
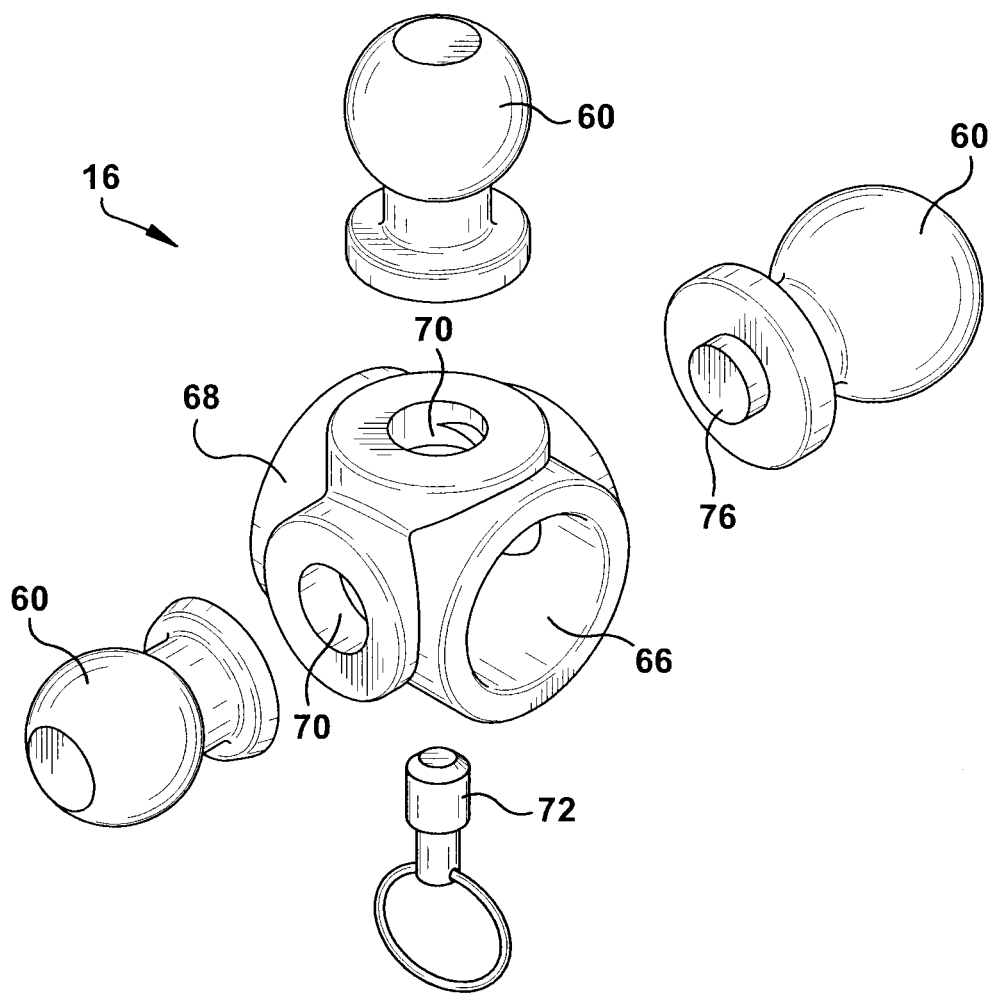
FIG. 9 illustrates a perspective view of the hitch ball member of the adjustable hitch assembly.

FIG. 9 illustrates the hitch ball member 16. The hitch ball member 16 may include a main body member 68 with an opening 66 located there through. The opening 66 may be correspondingly shaped and sized to receive the support rod 62 there through. The hitch ball member 16 may have one or more hitch balls 60 connected to the main body member 68. In one embodiment, the hitch balls 60 may be integrally formed with the body member 68. The hitch balls 60 may also be removably connected to the hitch ball member 16.

In an embodiment, the hitch ball member 16 may include three hitch balls 60 of varying sizes and diameters that may be connected to the body member 68. The cylindrically shaped opening 66 in the body member 68 may allow the hitch ball member 16 to rotate about the cylindrically shaped support rod 62 when the pin 72 is not inserted into an aperture 64 in the support rod 62. While the hitch balls 60 are shown extending radially from the opening 66 and configured approximately 90 degrees apart from each other, it is to be understood that the hitch balls 60 may be positioned in any appropriate manner or location on the body member 68.

As shown in FIG. 9, the body member 68 may have one or more openings 70 for attaching devices or accessory members, such as a hitch ball 60, for example. Other devices or accessory members, such as a step, a light, or other useful devices may also be attached to the openings 70 or accessory apertures. The devices to be attached may include a projection 76 located the end to be inserted into the opening 70. The projection 76 may be threaded, provide a compression fit or the like, to aid in attachment to the body member 68. The openings 70 may be threaded to receive a threaded portion of the hitch ball 60. Alternatively, the hitch balls 60 may connect to the hitch ball member 16 by welding, a compression fit, or by any other appropriate means known to those having skill in the art.

The hitch ball member 16 may include a pin 72 for securing the hitch ball member 16 to the ball support member 14. The pin 72 may be located within the main body member 68 and spring biased toward the center of the body member 68. The pin 72 may be removably connected to ball hitch member 16. The pin 72 may be a spring loaded integral lock pin. Using a spring loaded lock pin 72 prevents any pins or clips from being removed and lost since it is built-in. When the support rod 62 is inserted through the opening 66 in the body member 68, the pin 72 may align with an aperture 64 and be inserted into the aperture 64, thereby locking the ball hitch member 16 in the desired location on the ball support member 14. The hitch ball member 16 may quickly and easily rotate into the storage position without having to remove any pins and/or clips. In addition, the hitch balls 60 may rotate about the horizontal support rod 62 and lock into place with the spring loaded integral lock pin 72.

Figure 10:
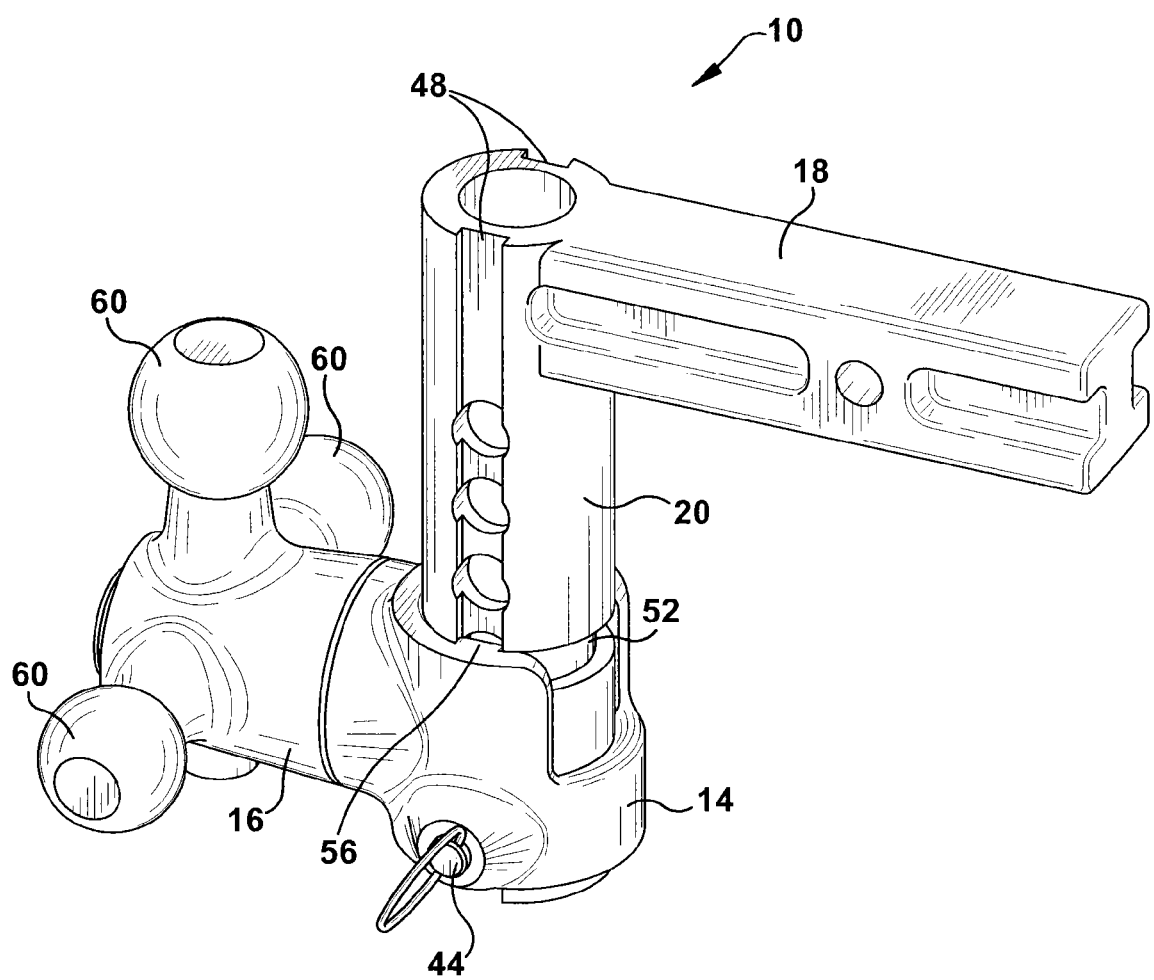
FIG. 10 illustrates a perspective view of an embodiment of the adjustable hitch assembly.

In an embodiment shown in FIG. 10, the shank member 20 may include two guiding slots 48 located approximately 180 degrees opposite of each other. The ball support member 14 may have two keys 56 configured to align with and move along the two guiding slots 48 when the pin member 44 is aligned with an opening 40. Removing the pin member 44 from the opening 40 may allow the ball support member 14 to move along the path of the guiding slot 48.

The inner sidewalls 50 may prevent the outer sidewalls 58 of the keys 56 from moving substantially perpendicular to the guiding slot 48, thereby preventing the ball support member 14 from rotating about the axis A-A. To rotate the ball support member 14, the keys 56 may be moved along the guiding slot 48 to align with the position of the rotating slot 52. The ball support member 14 may be rotated about the axis A-A, into the desired location, such as a storage position. The pin member 44 may then be inserted into a second opening (not shown), to lock the ball support member 14 into the storage position.

As illustrated in FIG. 10, the ball support member 14 may include one more hitch balls 60 connected to the ball support member 14, such as three hitch balls 60, for example. In one embodiment, the hitch balls 60 may be integrally formed with the ball support member 14. The hitch balls 60 may also be removable from the ball support member 14. By way of example, the hitch balls 60 may be connected to the hitch ball member 16 that is removable from the ball support member 14.

The hitch ball member 16 may be rotated to set the desired sized hitch ball 60 at a hitch position, such as at a substantially parallel position to that of the adjustable member 20, as shown in FIG. 10. The apertures 64 in the support rod 62 may be spaced approximately 90 degrees apart and configured to align with an opening 70 in the hitch ball member 16 any time a hitch ball 60 is in the hitch position. A user may remove the pin 72 from the aperture 64, rotate the hitch ball member 16 to set the desired hitch ball 60 in the hitch position, and then re-insert the pin 72 into the corresponding aperture 64 to secure the hitch ball member 16 into place. As discussed above, the components may be securely attached with snap rings 46, 78 to offer a complete assembled hitch assembly 10 that can be secured or locked to the vehicle using only one hitch lock pin. The snap rings 46, 78 may also be easily removed for easy servicing of the adjustable hitch assembly 10 if necessary.

Figure 11A:
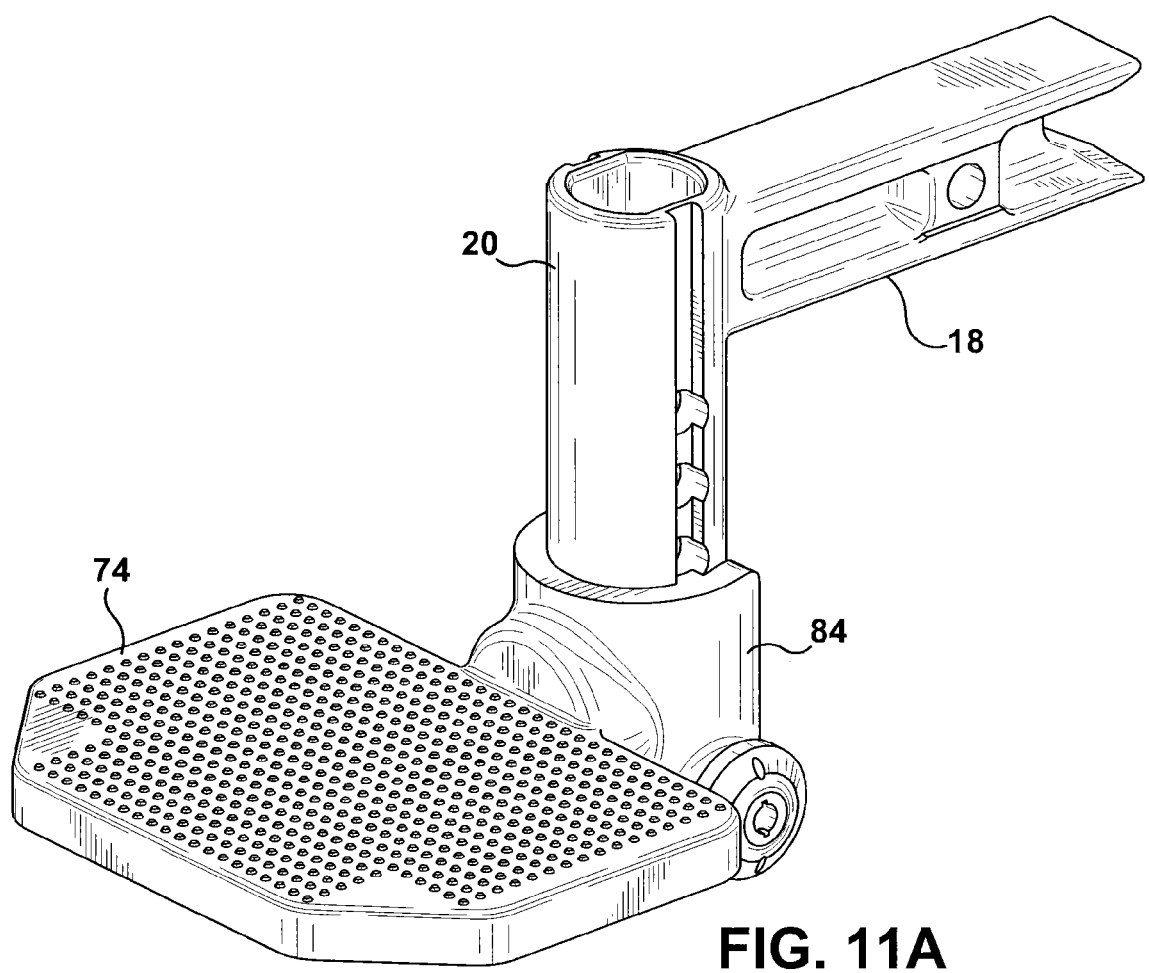
FIG. 11A illustrates a perspective view of an embodiment of the adjustable hitch assembly having a step.
Figure 11B:
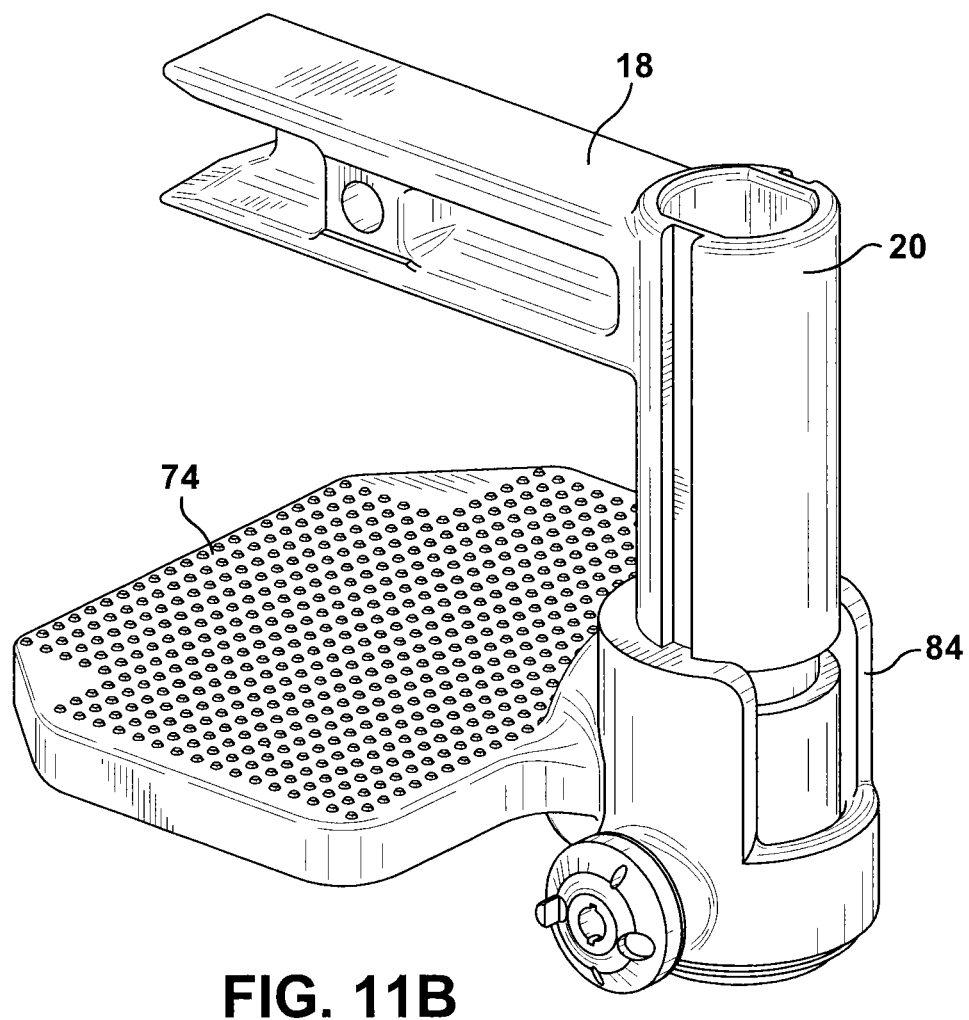
FIG. 11B illustrates a perspective view of an embodiment of the adjustable hitch assembly having a step in a storage position.

FIGS. 11A and 11B illustrate an alternative embodiment of the adjustable hitch assembly 10 that may also include a step 74. The step 74 may be of any appropriate shape or size. The step 74 may connect to the adjustable hitch assembly 10 such that it may be adjustable along the shank member 20. For example, the step 74 may be connected directly to a ball support member 84. In this embodiment, the ball support member 84 may be of a different shape or size to connect with the step 74. The step 74 and ball support member 84 may be integrally formed or attached by any appropriate means, such as fasteners, welding or the like, for example. The step 74 may be moved from step position, shown in FIG. 11A, to storage position, as shown in FIG. 11B, by rotating the ball support member 14 to the storage position.

Figure 12:
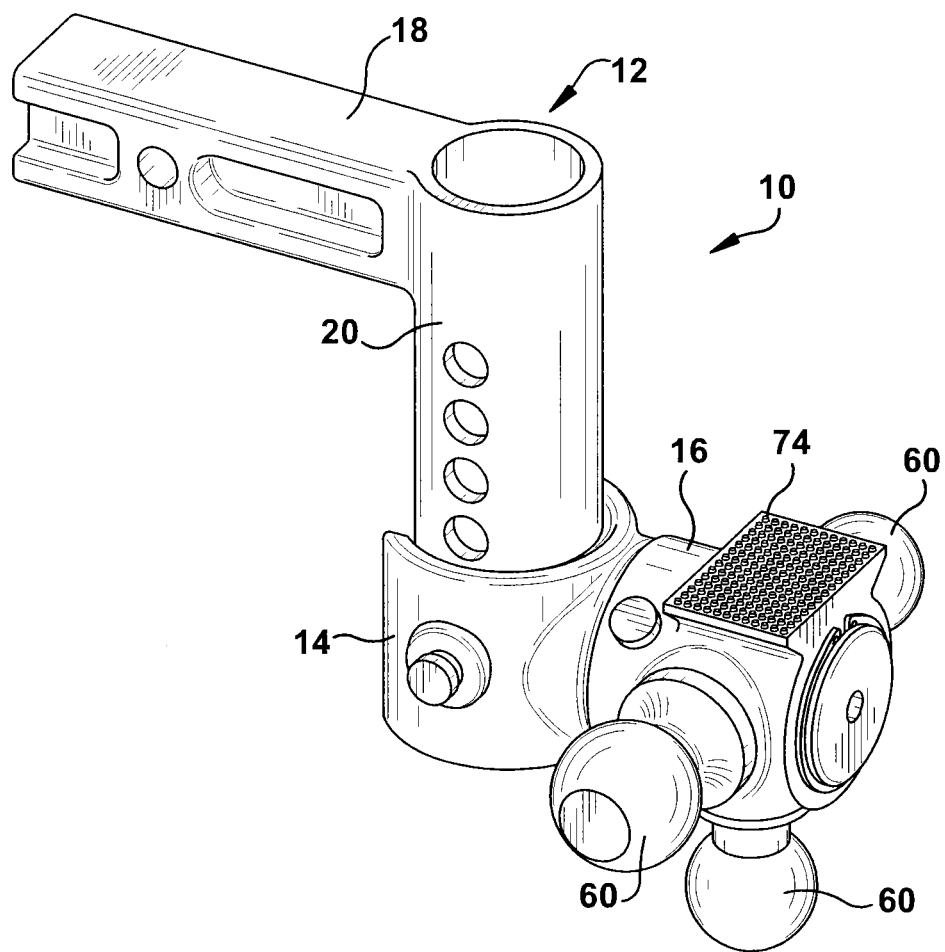
FIG. 12 illustrates a perspective view of an embodiment of the adjustable hitch assembly having a step connected to the hitch ball member.

In another alternative embodiment, the step 74 may be connected or integrally formed to the hitch ball member 16, as shown in FIGS. 5B and 12. The hitch ball member 16 may include the step 74 and one or more hitch balls 60. The step 74 may be moved to step position by rotating the hitch ball member 16 about the support rod 62 until the step 74 is in step position, as shown in FIG. 12.

Figure 13:
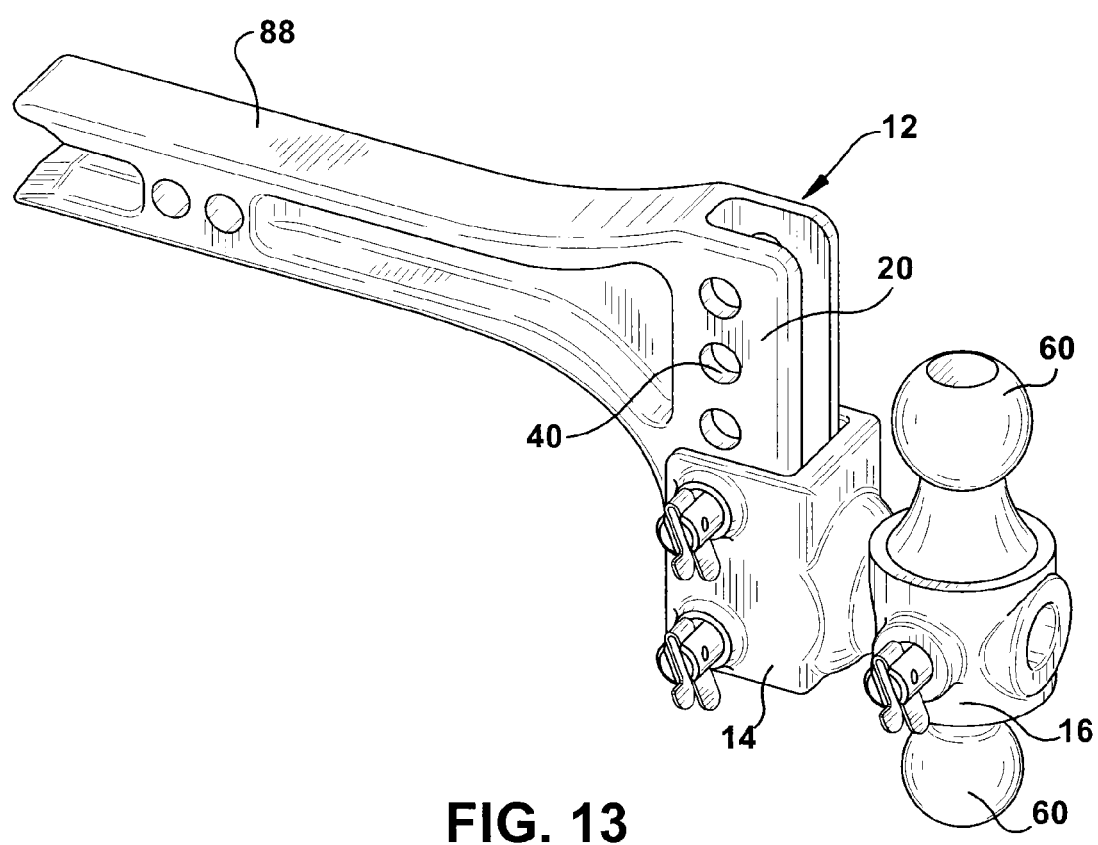
FIG. 13 illustrates a perspective view of an embodiment of an adjustable hitch assembly using a weight distributing hitch bar.
Figure 14:
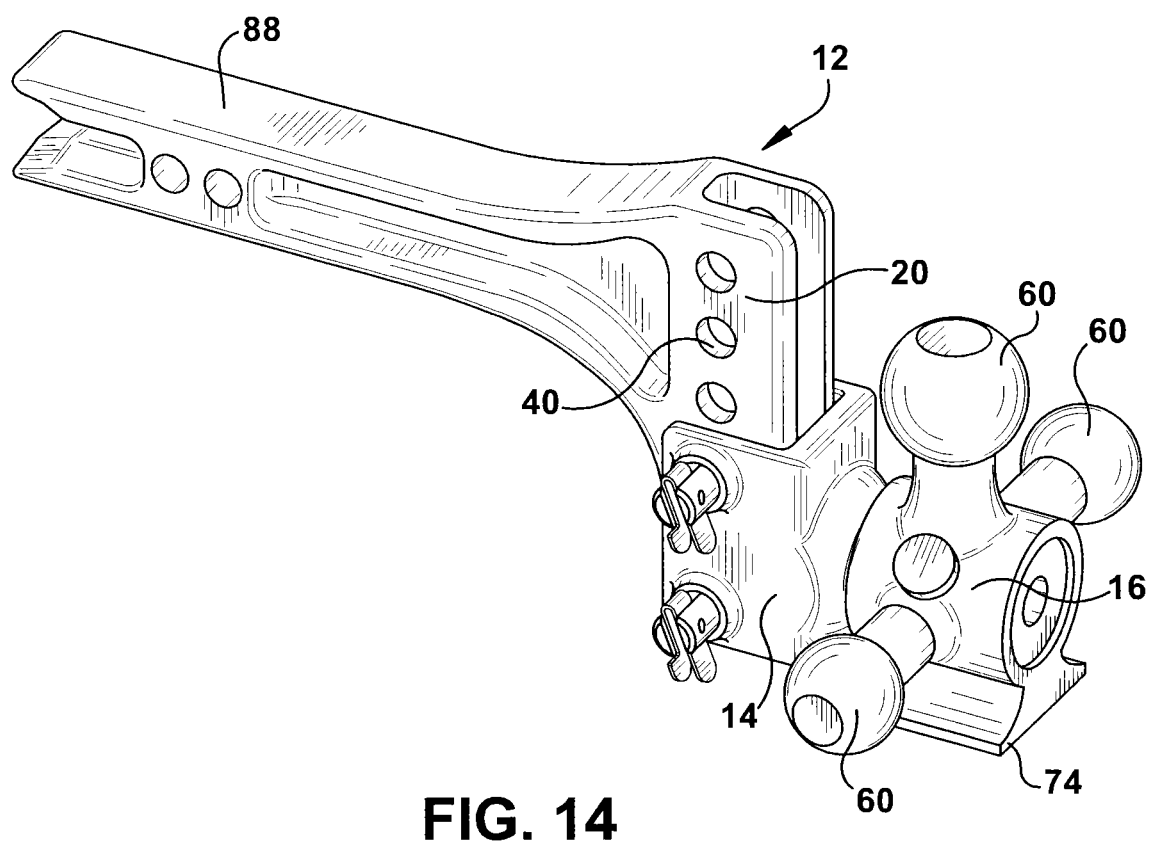
FIG. 14 illustrates a perspective view of an embodiment of an adjustable hitch assembly using a weight distributing hitch bar.

FIGS. 13 and 14 illustrate additional alternative embodiments of an adjustable hitch assembly 10. The base member 12 in these embodiments may utilize a notched end hitch bar such as hitch bar 88. Utilizing the notched end hitch bar 88 may absorb a portion of the reaction load that may be applied during operation of the adjustable hitch assembly 10.

Additional embodiments of an adjustable hitch assembly according the present teachings are described below. In the descriptions, all of the details and components may not be fully described or shown. Rather, the features or components are described and, in some instances, differences with the above-described embodiments may be pointed out. Moreover, it should be appreciated that these additional embodiments may include elements or components utilized in the above-described embodiments although not shown or described. Thus, the descriptions of these additional embodiments are merely exemplary and not all-inclusive nor exclusive. Moreover, it should be appreciated that the features, components, elements and functionalities of the various embodiments may be combined or altered to achieve a desired adjustable hitch assembly without departing from the spirit and scope of the present teachings.

Embodiments of an adjustable hitch assembly 100 are shown in FIGS. 15-19. The adjustable hitch assembly 100 may include a base member 112, a support member 114, and a hitch ball member 116. The hitch assembly 100 may connect to a towing vehicle and a towed vehicle, thereby linking the towed vehicle to the towing vehicle as described in more detail above.

The base member 112 may include a connecting portion 118 and a shank member 120. The connecting portion 118 may be connected to the shank member 120 in any appropriate manner. In some embodiments, the connecting portion 118 may extend perpendicularly from an end of the shank member 120. While FIGS. 15-19 show the connecting portion 118 generally extending perpendicularly from the shank member 120, the connecting portion 118 and shank member 120 may also be arranged in alternate configurations. The connecting portion 118 may be attached with the shank member 120 in any appropriate manner, such as being integrally formed therewith such as through welding, or forming as a monolithic unit.

The connecting portion 118 may connect to a towing vehicle in any appropriate manner. In some embodiments, the connecting portion 118 may connect to the receiving member 22 mounted to the towing vehicle. The receiving member 22 may have an opening sized and shaped similar to that of the connecting portion 118, whereby it is configured to receive the connecting portion 118. The receiving member 22 may be attached to the towing vehicle by any appropriate means, such as by being welded to the frame of the vehicle, secured under the bumper of the towing vehicle, or connected to the towing vehicle by other means commonly known to those skilled in the art.

The connecting apertures 26 of the receiving member 22 may secure the connecting portion 118 to the receiving member 22. The connecting portion 118 may include a pinhole 124. The pinhole 124 may be configured to generally align with the connecting holes 26 in the receiving member 22 when the connecting portion 118 is inserted into the receiving member 22. When the holes 26, 124 are generally aligned, the connecting portion 118 may be secured in place by inserting a pin (not shown) through holes 124, 26.

As shown in FIGS. 15-19, the shank member 120 may be shaped and sized to engage the support member 114 in any appropriate manner. In some embodiments, the shank member 120 may be generally rectangular in shape, having an axis B-B defined by the center points of the rectangular shank member 120, such as shown in FIG. 16. By using a rectangular vertical post for the shank member 120 the adjustable hitch assembly 100 may be positionable in the appropriate operative location as described in more detail below.

The connecting portion 118 may be selectively secured to the receiving member 22 in any appropriate direction such that the shank member 120 may extend in any appropriate direction relative to the ground. In such embodiments, the connecting portion 118 may be selectively secured to the receiving member 22 in one direction such that the shank member 120 generally extends upward from the connecting portion 118. The connecting portion 118 may then be rotated approximately 180 degrees such that the shank member 120 extends generally downward relative to the connecting portion.

The shank member 120 may include at least one opening 140 along its surface. As shown in FIG. 16, the shank member 120 may have at least one opening 140 extending through the surface of the shank member 120. In some embodiments, the shank member 120 may include a plurality of openings 140 arranged linearly along the surface of the shank member 120, and a corresponding set of openings (not shown) located on the opposite side of the shank member 120, whereby the openings may be arranged similar to the first plurality of openings 140 and located 180 degrees opposite the first plurality of openings 140. While FIG. 16 shows a plurality of openings 140 aligned linearly, it should be appreciated that the shank member 120 may include any number of openings 140 arranged in any configuration.

Figure 17:
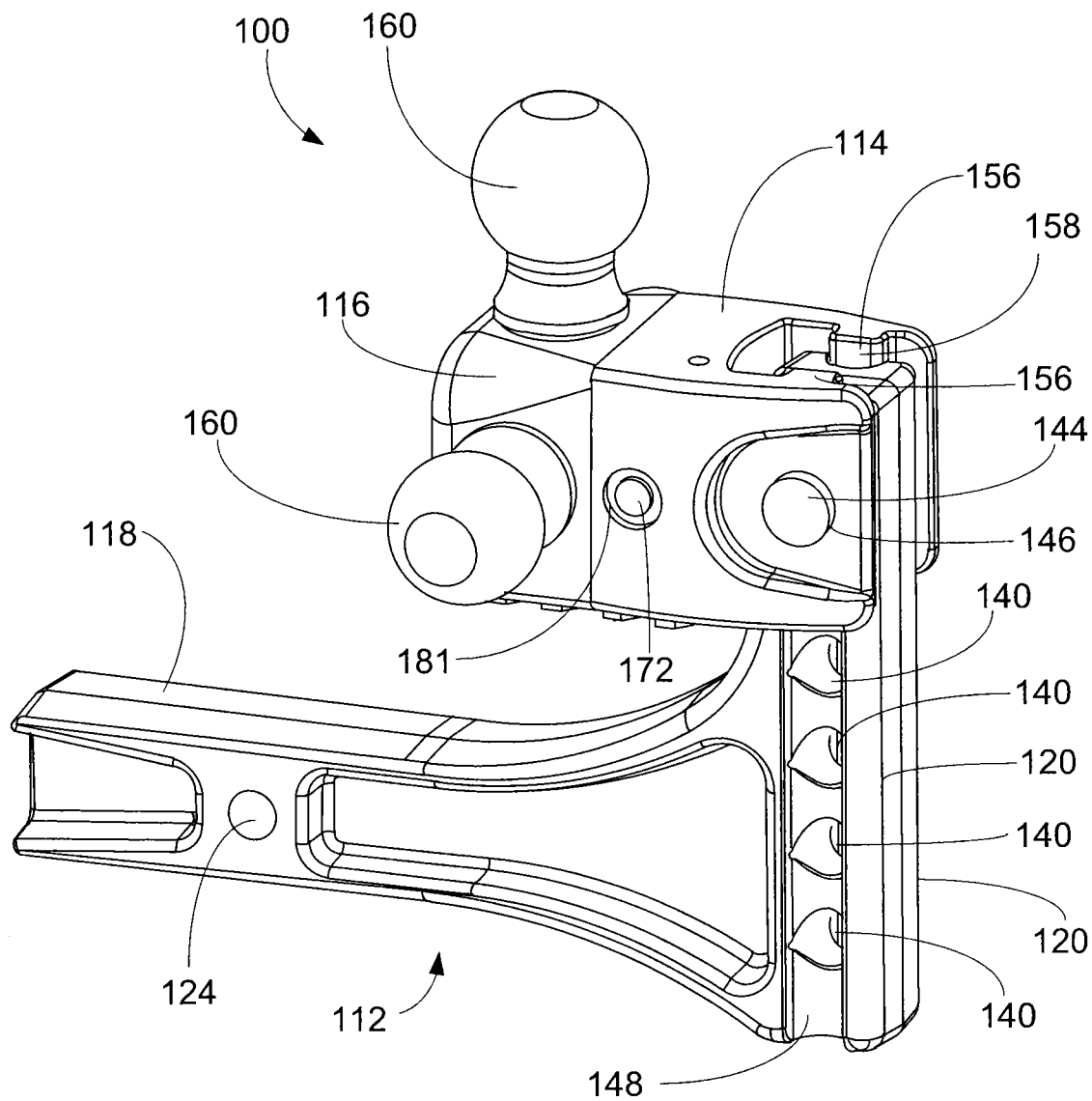
FIG. 17 illustrates a perspective view of the adjustable hitch assembly of FIG. 15.
Figure 18:
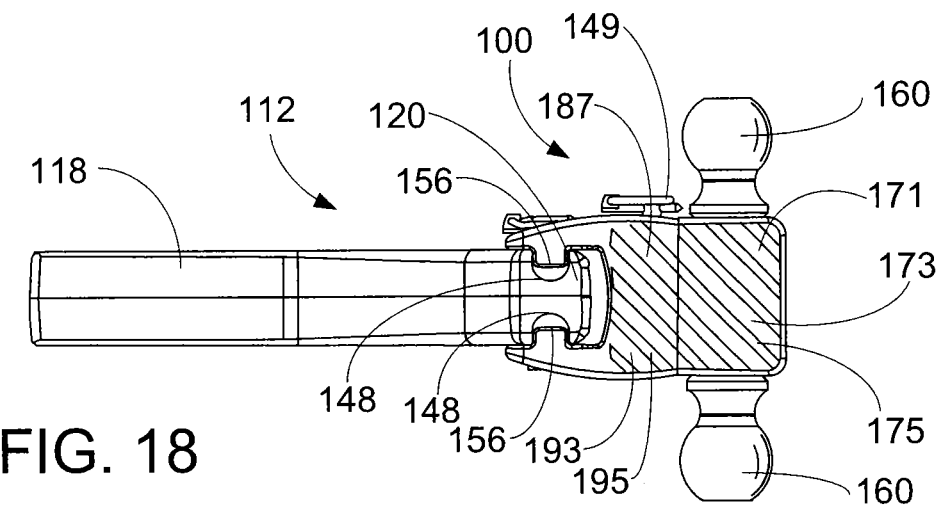
FIG. 18 illustrates a plan view of embodiments of an adjustable hitch assembly.

The support member 114 may include an opening 142. The opening 142 may be sized and shaped to receive the shank member 120. In one embodiment, the opening 142 may be of a substantially rectangular shape such that it may matingly engage with the shank member 120. The shank member 120 may be inserted into the opening 142, as shown in FIGS. 16 and 17. The support member 114 may be vertically adjustable along the axis B-B. Further, the support member 114 may include a generally open portion 143, which may be positioned at any appropriate position, such as on a back side of the support member 114 as shown in FIG. 15. The open portion 143 may permit the support member 114 to be selectively removed from the shank member 120 in either direction along the axis B-B. By way of a non-limiting example, the support member 114 may be selectively vertically positioned along the axis B-B either upward or downward relative to the shank member 120 to remove such therefrom.

The support member 114 may also include at least one pin member 144 and an aperture 145 located on at least one side thereof. In some embodiments, the aperture 145 may be positioned on both sides of the support member 114. The pin member 144 may be removable from the support member 114, or fixedly connected to the support member 114 in any appropriate manner. The pin member 144 may shaped and sized to be insertable into and extend through the aperture 145 and through the opening 142. While FIGS. 15-17 and 19 shows the support member 114 with one pin member 144, the support member 114 may include more than one pin member 144. In some embodiments, the support member 114 may include two pin members 144 arranged 180 degrees opposite to each other.

The support member 114 may be secured into place on the shank member 120 by aligning the aperture 145 with the desired opening 140 at the desired height and location along the shank member 120 along the axis B-B. The pin member 144 may be inserted into the aperture 145 and into the selected opening 140 to lock the support member 114 in place, thereby generally preventing the support member 114 from moving along the axis B-B. Once inserted, to further secure the pin member 144, the pin member 144 may include an aperture 147 in any appropriate location and a cotter pin 149. The cotter pin 149 may be shaped and sized such that it may be inserted into and through the aperture 147 of the pin member 144. This may generally prevent the pin member 144 from being removed from the opening 140 and the aperture 145.

The support member 114 may be positioned to a towing position where the hitch ball member 116 may extend away from the connecting member 118. To store the hitch ball member 116, the support member 114 may be rotated into a storage position or may be removed from the shank member 120. To move the support member 114 from a towing position to a storage position, the pin member 144 may be removed from the aperture 145 in the support member 114 and the opening 140 in the shank member 120. The support member 114 may be removed from the shank member 120 by vertically positioning such upward or downward. The support member 114 may then be rotated approximately 180 degrees and then attached to the shank member 120 by slidingly engaging the opening 142 with the shank member 120.

In some embodiments, the shank member 120 may include one or more guide members 148. The guide members 148 may consist of a recessed area in the outer surface of the shank member 120, formed between two inner sidewalls 150, such as for example a slot. The inner sidewalls 150 may be substantially parallel to the axis B-B. The guide member 148 may extend an entire length of the shank member 120. Further, the guide member 148 may include open ends on at least one of the upper or lower ends. In some embodiments, the guide member 148 may include an open ends on both of the upper and lower ends.

The support member 114 may include at least one engaging member 156, located on an interior surface 157 of the opening 142 of the support member 114. The engaging member 156 may be a key and may include outer sidewalls 158 that may extend into the opening 142 and may generally extend an entire length of the support member 114. In some embodiments, there may be two keys 156 located within the opening 142 that extend substantially an entire height of the support member 114. While the two keys 156 are shown being located opposite of one another, it is understood that they may be located at any appropriate position in the support member 114, such that they may correspond to the location(s) of the guiding member(s) 148 on the shank member 120. Further, any number of keys 156 may be used without departing from the present teachings. For example, each interior surface 157 of the opening 142 may include a single key 156 that may extend the entire length thereof, or may include four keys 156 that may be opposite one another and may extend the entire length thereof.

The size and shape of each key 156 may correspond to the size and shape of the guiding member 148 such that the key 156 may move within the guiding member 148. Further, the key 156 may generally fill the guiding member 148 such that there may be a small amount of space therebetween. By way of a non-limiting example, the key 156 may slide within the guiding member 148 such that the support member 114 may be selectively positioned along the length of the shank member 120. The rectangular vertical shank member 120 and the opening 142 having a generally mating rectangular shape may allow the ball member support member 114 to slide and adjust easily up and down the shank member 120. Further, the key 156 generally sliding within the guiding member 148 may keep the components generally aligned while adjusting the height of the hitch assembly 100.

When the shank member 120 is inserted into the opening 142 in the support member 114, the key 156 may be aligned with the guiding member 148 and may fit inside the guiding member 148. The support member 114 may then be movable along the path of the guiding member 148 to position the support member 114 at the desired location. The engagement of the key 156 and the guiding member 148 may generally prevent the support member 114 from rotating relative to the shank member 120, or more specifically rotating perpendicular relative to the axis B-B. The engagement may also generally carry moment forces and longitudinal loads applied to the hitch assembly 100 during operation. In such embodiments, the key 156 engaging the guiding member 148 may provide additional material that accepts the load applied during operation. Specifically, the moment force applied to the hitch assembly 100 during operation occurs due to the distance between the engagement of the hitch assembly 100 and the towing vehicle and the engagement of the hitch assembly 100 and towed vehicle. This distance plus the longitudinal force applied during operation results in the moment force. The engagement between the key 156 and the guide member 148 may carry this moment force. The key 156 extending generally the entire height of the support member 114 may displace the moment force along the entire length of the engagement of the key 156 with the guiding member 148. Displacing the moment forces along this additional length may provide a more stable hitch assembly 100. In other prior art versions, the moment force may be applied by a pin alone.

The hitch ball member 116 may include a support rod 162. The support rod 162 may be integrally formed in the hitch ball member 116, or may be removably connected to the hitch ball member 116 by any appropriate means, such as fasteners, welding or the like. The support rod 162 may include at least one aperture 164 located on the surface of the support rod 162. While shown as having more than one aperture 164 located radially around the support 162, it is to be understood that the support rod 162 may have any number of apertures 164 located at any appropriate location on the support rod 162.

The support rod 162 may be shaped and sized to engage a similarly shaped opening 166 located in the support member 114. While a generally cylindrically shaped support rod 162 is shown, it is to be understood that the support rod 162 may be of any appropriate shape or size, such as correspondingly shaped and size to fit within the opening 166 in the support member 114. The support rod 162 may include a groove 163. The groove 163 may be of any appropriate shape and size. As shown in FIG. 15, the hitch ball assembly 100 may further include a snap ring 165. The snap ring 165 may be capable of engaging the groove 163, which may further engage the support member 114 with the hitch ball member 116. Specifically, the snap ring 165 may hold the support rod 162 within the support member 114.

Figure 19:
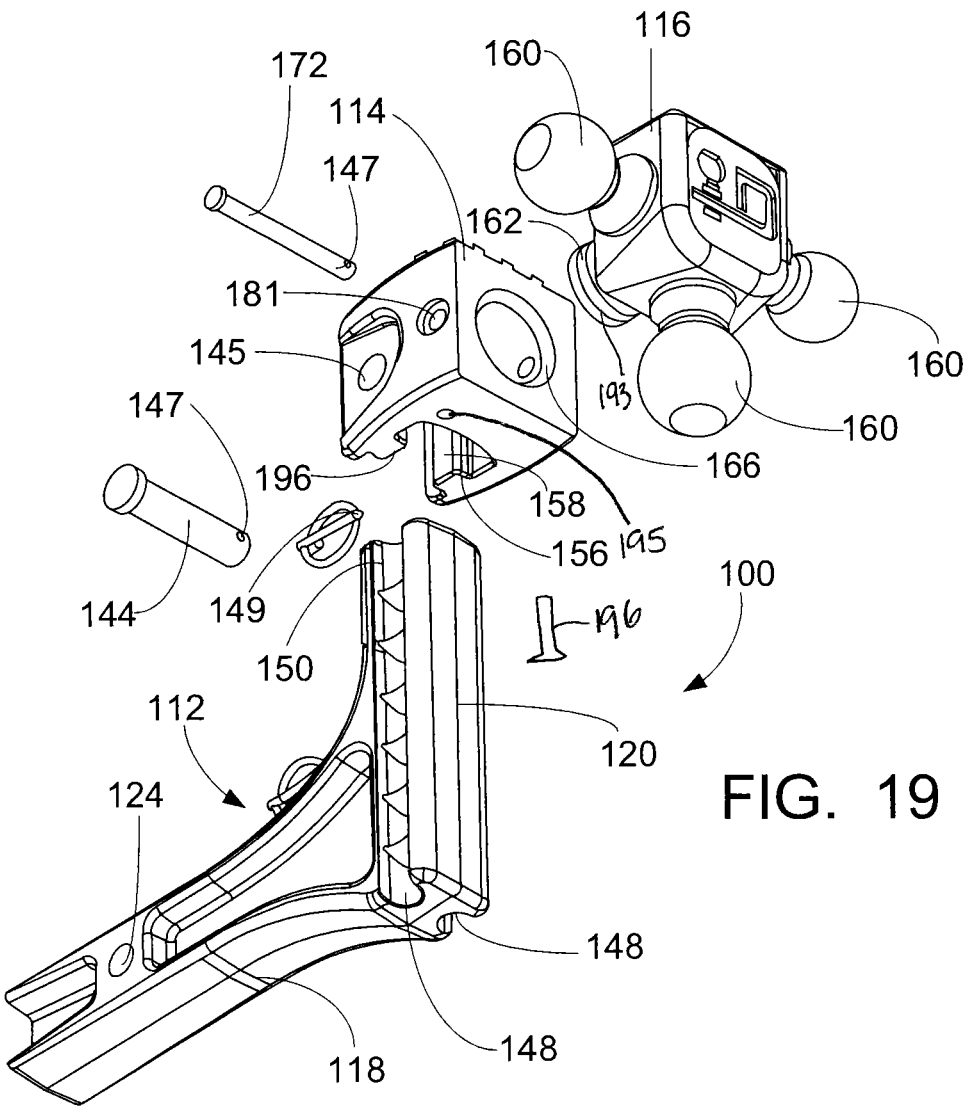
FIG. 19 illustrates an exploded view of embodiments of an adjustable hitch assembly.

In some embodiments, such as that shown in FIG. 19, the support rod 162 may include a groove 193. The groove 193 may be of any appropriate shape and size. The support member 114 may include an aperture 195 at any appropriate location and of any appropriate shape and size, such as on a bottom portion thereof. The aperture 195 may be countersunk into the support member 114 to generally hide such. The support rod 162 may be inserted into the opening 166 such that the groove 193 may generally align with the aperture 195. Upon such alignment, a fastener 196 may be inserted into and through the aperture 195 and may engage the groove 193. The ball support member 116 may then rotate around the fastener 196 along the groove 193. This may further engage the support member 114 with the hitch ball member 116. The fastener 196 may be a socket head bolt with an Allen head that may be driven into the counter-sunk aperture 195 to generally hide the fastener 196 from sight.

The hitch ball member 116 may include a main body member 168 with one or more hitch balls 160 connected to the main body member 168. In some embodiments, the hitch balls 160 may be integrally formed with the body member 168. The hitch balls 160 may also be removably connected to the hitch ball member 116. The hitch ball member 116 may also include a stepping surface 171. The stepping surface 171 may include a base surface 173 and a plurality of protrusions 175 extending generally upward from the base surface 173.

By way of a non-limiting example, the hitch ball member 116 may include three hitch balls 160 of varying sizes and diameters that may be connected to the body member 168 and the stepping surface 171. The cylindrically shaped support rod 162 in the body member 168 may allow the hitch ball member 116 to rotate about the support member 114 when a pin 172 is not inserted into the aperture 164 in the support rod 162. While the hitch balls 160 and stepping surface 171 are shown extending radially from the body member 168 and configured approximately 90 degrees apart from each other, it is to be understood that the hitch balls 160 and stepping surface 171 may be positioned in any appropriate manner or location on the body member 168.

The support member 114 may also include an aperture 181 that may generally align with at least one of the apertures 164 on the support rod 162 upon insertion of the support rod 162 into the aperture 166. When so inserted, the pin 172 may be inserted into the apertures 166 and 181, which may selectively secure the hitch support member 114 with the hitch ball member 116.

In some embodiments, the hitch support member 114 may include a stepping surface 187. The stepping surface 187 may include a base surface 193 and a plurality of protrusions 195 extending generally upward from the base surface 193. In such embodiments, the stepping surface 187 may generally match the stepping surface 171. While in other embodiments, the stepping surfaces 171, 187 do not generally match. When the stepping surface 171 is positioned upward, such as shown in FIG. 16, the stepping surfaces 171, 187 may be generally aligned. This may create a larger stepping area for a user.

Figure 20:
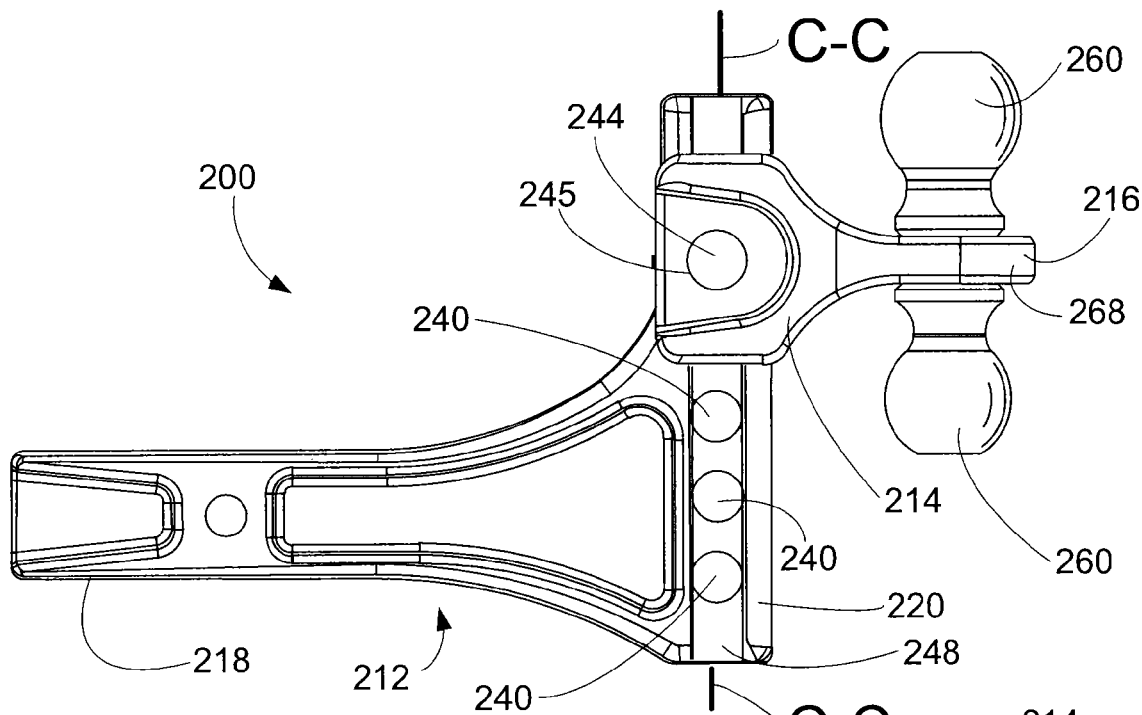
FIG. 20 illustrates a side view of embodiments of an adjustable hitch assembly.
Figure 21:
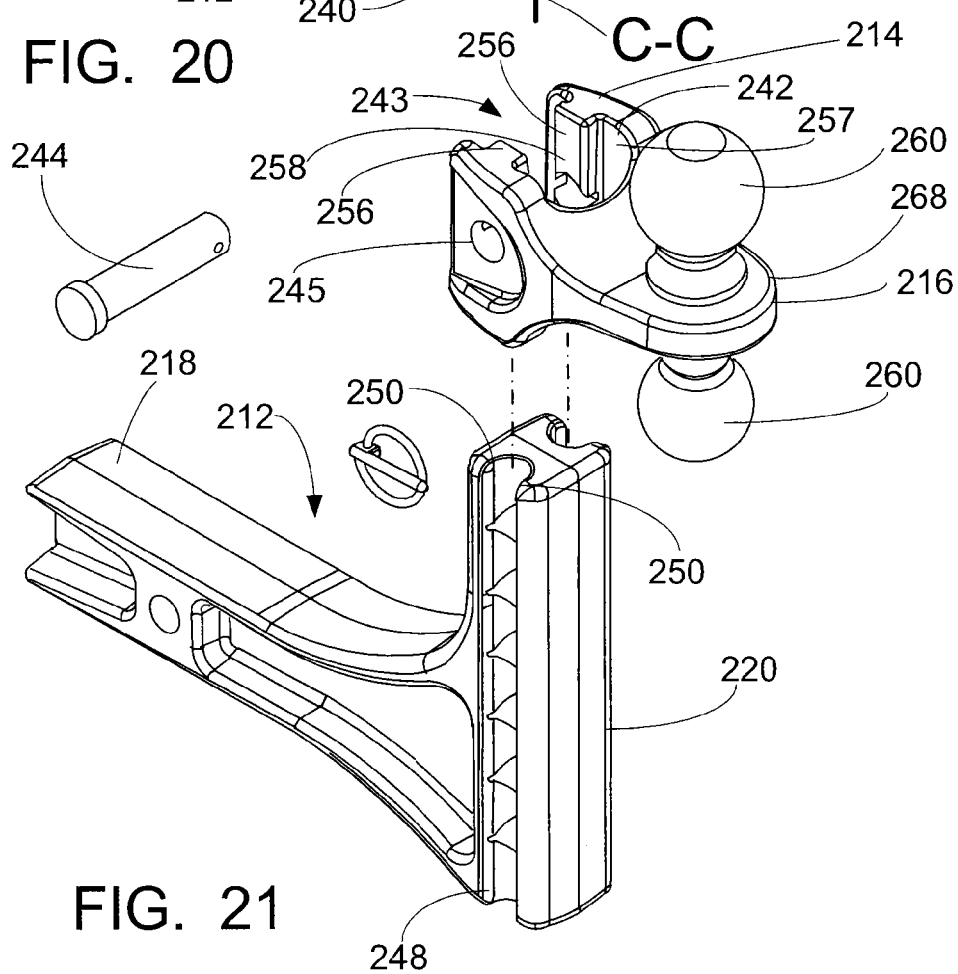
FIG. 21 illustrates an exploded view of the adjustable hitch assembly of FIG. 20.

An adjustable hitch assembly 200 as shown in FIGS. 20-21 may include a base member 212, a support member 214 and a hitch ball member 216 integrally formed with the support member 214. The base member 212 may include a connecting portion 218 and a shank member 220. The connecting portion 218 may be connected to the shank member 220 and may extend perpendicularly from one end of the shank member 220. The connecting portion 218 may connect to a towing vehicle in any appropriate manner.

The shank member 220 may be shaped and sized to engage the support member 214, such as described above. The shank member 220 may include at least one opening 240 along its surface. As shown in FIG. 20, the shank member 220 may have a plurality of openings 240 arranged linearly along the surface of the shank member 220, and a corresponding set of openings (not shown) located on the opposite side of the shank member 220. The support member 214 may include an opening 242. The opening 242 may be sized and shaped to receive the shank member 220. When the shank member 220 is inserted into the opening 242, the support member 214 may be vertically adjustable along an axis C-C of the shank member 220. The support member 214 may include a generally open portion 243. The open portion 243 may permit the support member 214 to be selectively removed from the shank member 220 in either direction along the axis C-C. By way of a non-limiting example, the support member 214 may be selectively vertically positioned either upward or downward relative to the shank member 220 to remove such therefrom.

The support member 214 may also include at least one pin member 244 and an aperture 245 on both sides of the support member 214. The pin member 244 may extend into and through the aperture 245 and through the opening 242. The support member 214 may be secured into place on the shank member 220 by aligning the apertures 245 with the desired opening 240 at the desired height and location along the shank member 220. The pin member 244 may be inserted into the aperture 245 and into the selected opening 240 to lock the support member 214 in place, thereby generally preventing the support member 214 from moving along the axis C-C.

The shank member 220 may include one or more guiding members 248. The guiding member 248 may consist of a recessed area in the outer surface of the shank member 220, formed between two inner sidewalls 250. The inner sidewalls 250 may be substantially parallel to the axis C-C.

The support member 214 may include at least one engaging member 256 or key, located on an interior surface 257 of the opening 242 of the support member 214. The key 256 may include outer sidewalls 258 that may extend into the opening 242 and may extend an entire length of the support member 214. There may be two keys 256 located within the opening 242. While the two keys 256 are shown being located opposite of one another, it is understood that they may be located at any appropriate position in the support member 214, such that they may correspond to the location(s) of the guiding member (s) 248 on the shank member 220. Further, any number of keys 256 may be used without departing from the present teachings. For example, each interior surface 257 of the opening 242 may include a pair of keys 256 that may extend the entire length thereof.

The size and shape of each key 256 may correspond to the size and shape of the guiding member 248 such that the key 256 may move within the guiding member 248. The rectangular vertical shank member 220 may allow the support member 214 to slide and adjust easily up and down the shank member 220 with the key 256 in the guiding member 248 to keep the components aligned while adjusting the height of the hitch assembly 200.

When the shank member 220 is inserted into the opening 242 in the support member 214, the key 256 may be aligned with the guiding member 248 and may fit inside the guiding member 248. The support member 214 may then be movable along the path of the guiding member 248 to position the support member 214 at the desired location. The engagement of the key 256 and the guiding member 248 may generally prevent the support member 214 from rotating relative to the shank member 220, or more specifically rotating perpendicular relative to the axis C-C. The engagement may also generally carry moment forces and longitudinal loads applied to the hitch assembly 200 during operation. In such embodiments, the key 256 engaging the guiding member 248 may provide additional material that accepts the load applied during operation. This engagement may carry this moment force. The key 256 extending generally the entire height of the support member 214 may displace the moment force along the entire length of the engagement of the key 256 with the guiding member 248. Displacing the moment forces along this additional length may provide a more stable hitch assembly 200.

The hitch ball member 216 may be integrally formed with the support member 214, such as through attaching the hitch ball member 216 with the support member 214 or forming them together as a monolithic unit. The support member 214 and hitch ball member 216 may be attaching in any appropriate manner, such as welding, using adhesives, or the like.

The hitch ball member 216 may include a main body member 268 with one or more hitch balls 260 connected to the main body member 268. In some embodiments, the hitch balls 260 may be integrally formed with the body member 268. The hitch balls 260 may also be removably connected to the hitch ball member 216.

Figure 22:
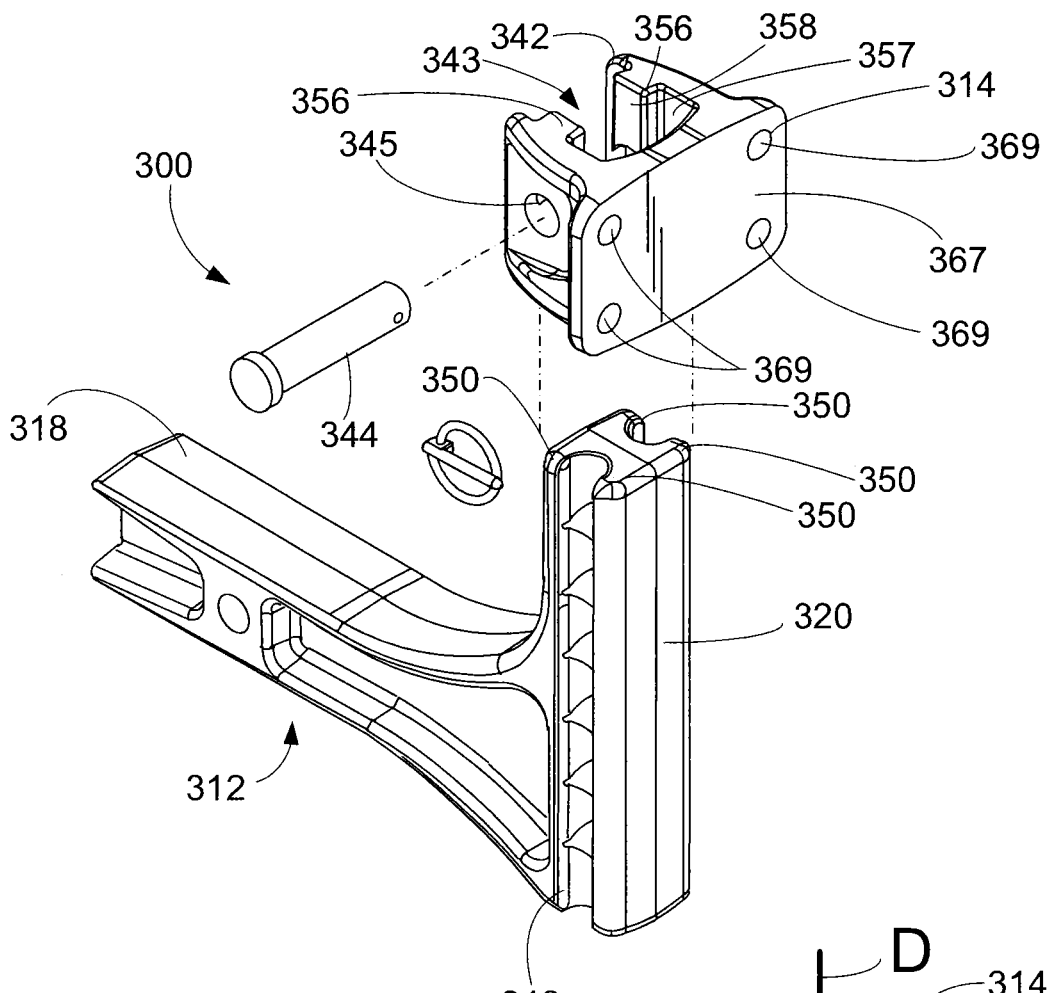
FIG. 22 illustrates an exploded view of an adjustable hitch assembly.
Figure 23:
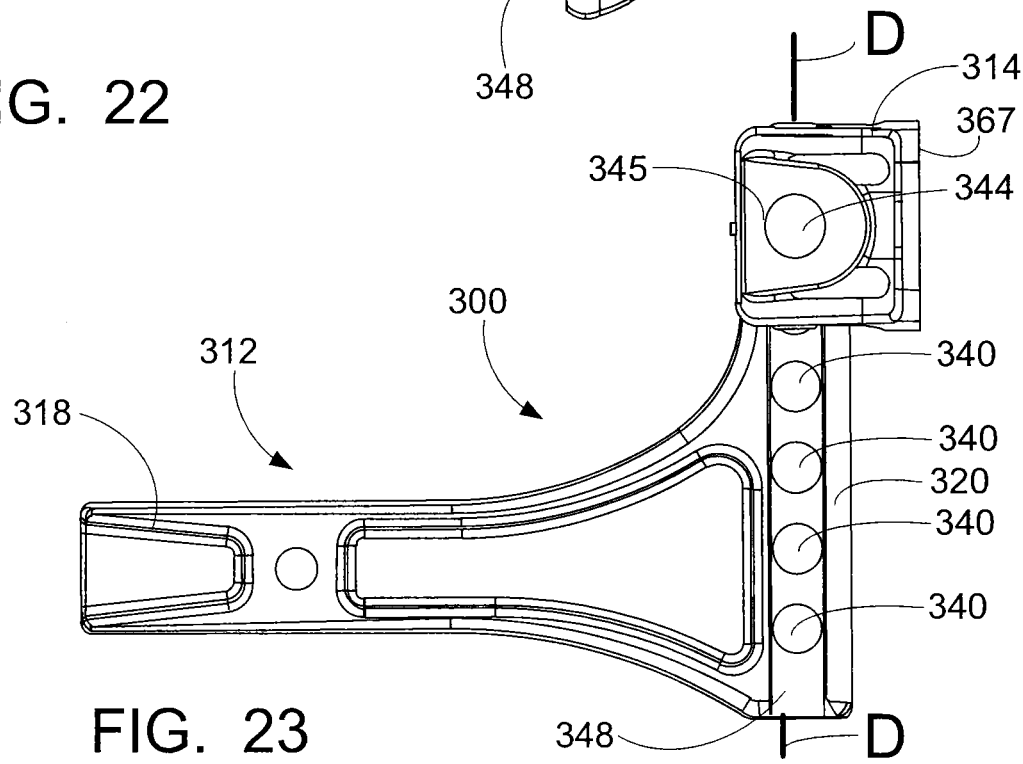
FIG. 23 illustrates a side view of the adjustable hitch assembly of FIG. 22.

An adjustable hitch assembly 300 as shown in FIGS. 22-23 may include a base member 312 and a support member 314. The base member 312 may include a connecting portion 318 and a shank member 320. The connecting portion 318 may be connected to the shank member 320 and may extend perpendicularly from one end of the shank member 320. The connecting portion 318 may connect to a vehicle in any appropriate manner.

The shank member 320 may be shaped and sized to engage the support member 314, such as described above. The shank member 320 may include at least one opening 340 along its surface. As shown in FIG. 23, the shank member 320 may have a plurality of openings 340 arranged linearly along the surface of the shank member 320, and a corresponding set of openings (not shown) located on the opposite side of the shank member 320. The support member 314 may include an opening 342. The opening 342 may be sized and shaped to receive the shank member 320. When the shank member 320 is inserted into the opening 342, the support member 314 may be vertically adjustable along an axis D-D of the shank member 320. The support member 314 may include a generally open portion 343. The open portion 343 may permit the support member 314 to be selectively removed from the shank member 320 in either direction along the axis D-D. By way of a non-limiting example, the support member 314 may be selectively vertically positioned either upward or downward relative to the shank member 320 to remove such therefrom.

The support member 314 may also include at least one pin member 344 and an aperture 345 on both sides of the support member 314. The pin member 344 may extend into and through the aperture 345 and through the opening 342. The support member 314 may be secured into place on the shank member 320 by aligning the apertures 345 with the desired opening 340 at the desired height and location along the shank member 320. The pin member 344 may be inserted into the aperture 345 and into the selected opening 340 to lock the support member 314 in place, thereby generally preventing the support member 314 from moving along the axis D-D.

The shank member 320 may include one or more guiding members 348. The guiding member 348 may consist of a recessed area in the outer surface of the shank member 320, formed between two inner sidewalls 350. The inner sidewalls 350 may be substantially parallel to the axis D-D.

The support member 314 may include at least one engaging member 356 such as key 356, located on an interior surface 357 of the opening 342 of the support member 314. The key 356 may include outer sidewalls 358 that may extend into the opening 342 and may extend an entire length of the support member 314. There may be two keys 356 located within the opening 342. While the two keys 356 are shown being located opposite of one another, it is understood that they may be located at any appropriate position in the support member 314, such that they may correspond to the location(s) of the guiding member(s) 348 on the shank member 320. Further, any number of keys 356 may be used without departing from the present teachings. For example, each interior surface 357 of the opening 342 may include a pair of keys 356 that may extend the entire length thereof.

The size and shape of each key 356 may correspond to the size and shape of the guiding member 348 such that the key 356 may move within the guiding member 348. The rectangular vertical shank member 320 may allow the hitch ball member 316 to slide and adjust easily up and down the shank member 320 with the key 356 in the guiding member 348 to keep the components aligned while adjusting the height of the hitch assembly 300.

When the shank member 320 is inserted into the opening 342 in the support member 314, the key 356 may be aligned with the guiding member 348 and may fit inside the guiding member 348. The support member 314 may then be movable along the path of the guiding member 348 to position the support member 314 at the desired location. Further, during operation of the hitch assembly 300, the key 356 may engage a portion of the guiding member 348. The engagement of the key 356 and the guiding member 348 may generally prevent the support member 314 from rotating relative to the shank member 320, or more specifically rotating perpendicular relative to the axis D-D. The engagement may also generally carry moment forces and longitudinal loads applied to the hitch assembly 300 during operation. In such embodiments, the key 356 engaging the guiding member 348 may provide additional material that accepts the load applied during operation. Specifically, the moment force applied to the hitch assembly 300 during operation occurs due to the distance between the engagement of the hitch assembly 300 and the towing vehicle and the engagement of the hitch assembly 300 and towed vehicle. This distance plus the longitudinal force applied during operation results in the moment force. The engagement between the key 356 and the guide member 348 may carry this moment force. The key 356 extending generally the entire height of the support member 314 may displace the moment force along the entire length of the engagement of the key 356 with the guiding member 348. Displacing the moment forces along this additional length may provide a more stable hitch assembly 300. In other prior art versions, the moment force may be applied by a pin alone.

The support member 314 may include a generally flat face 367. The generally flat face 367 may include a plurality of attachment mechanisms 369, such as the apertures shown in FIG. 22. The generally flat face 367 and attachment mechanism 369 may permit any appropriate accessory to be selectively or fixedly attached to the support member 314. By way of a non-limiting example, a pintle hook, hitch ball member, step, cargo carrier, cargo accessory, or the like may be attached. Further still any decorative plate (not shown) may be attached to the flat face 367 and the attachment mechanism 369. This may be useful when the user has attached a hitch ball member and no longer wishes to use such. The user may then attached the support member 314 and include a decorative face plate.

Figure 24:
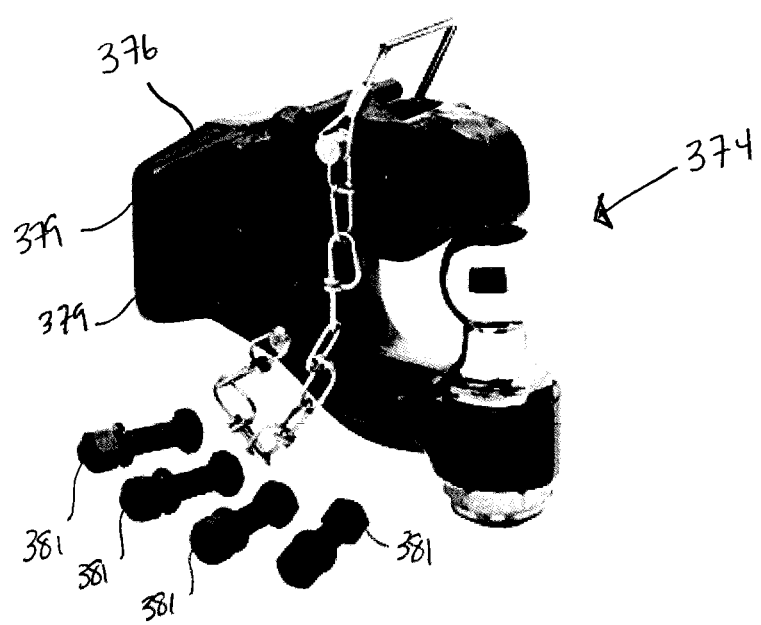
FIG. 24 illustrates an embodiment of a pintle hook assembly.

As noted previously, a pintle hook 374, such as that shown in FIG. 24, may be attached to the face 367 in any appropriate manner. Doing so may provide a pintle hook that may be vertically adjustable in an easy and efficient manner. In such embodiments, a user may utilize the pintle hook 374 with the adjustable hitch assembly 300. This may permit the user to vertically adjust the height of the pintle hook 374 by merely removing the pin member 344, adjusting the location of the support member 314 along the shank 320 member and then reinserting the pin member 344 through the apertures 345, 340 to selectively fix the location of the pintle hook 374.

The pintle hook 374 may include a plate member 376 that may be generally alignable with the face 367. The plate member 376 may include a plurality of attachment mechanisms 379 that may generally align with the attachment mechanisms 369 on the face 367. Upon such alignment, fasteners 381 may be inserted into the attachment mechanisms 369, 379 and selectively secured thereto. This may secure the pintle hook 374 with the support member 314. The pintle hook 374 may then be removed from the support member 314 and then the hitch ball member, such as one similar to hitch ball member 116 may be attached to the face 367 in any appropriate manner. Additionally, any other suitable accessory may be attached and selectively removed from the face 367.

The invention has been described with reference to the embodiments. Obviously, modifications and alternations will occur to others upon a reading and understanding of this specification. The claims as follows are intended to include all modifications and alterations insofar as they come within the scope of the claim or an equivalent thereof.

Having thus described the invention, we claim:

1. An adjustable hitch assembly comprising:
    a vehicle attachment member capable of selective engagement with a towing vehicle;
    a shank extending from said vehicle attachment member, said shank having a length;
    a guide member positioned in and extending at least a portion of said length of said shank, wherein said guide member extends inwardly on opposite sides of said shank;
    a support member comprising an opening to selectively attach said support member to said shank through said opening; and
    an engaging member integrally formed with said support member within said opening of said support member, wherein said engaging member matingly engages with said guide member generally preventing rotation of said support member relative to said shank.

2. The adjustable hitch assembly of claim 1, wherein said support member includes a height and said engaging member extends substantially said height of said support member.

3. The adjustable hitch assembly of claim 1, wherein said engaging member is formed with said support member as a monolithic unit.

4. The adjustable hitch assembly of claim 1, wherein said support member includes a second engaging member positioned laterally from said engaging member.

5. The adjustable hitch assembly of claim 4, wherein said engaging and second engaging members generally prevent rotation of said support member relative to said shank when engaged with said guide member.

6. The adjustable hitch assembly of claim 5, wherein said engaging and second engaging members are male members and said guide member is a matingly shaped female member.

7. The adjustable hitch assembly of claim 1 wherein said engaging member in engagement with said guide member supports a moment load applied during operation.

8. The adjustable hitch assembly of claim 1, further comprising a hitch ball member capable of selective attachment to said support member, wherein said hitch ball member has at least one accessory aperture.

9. The adjustable hitch assembly of claim 1, further comprising a hitch ball member integrally formed with said support member.

10. The adjustable hitch assembly of claim 1, wherein said engaging member generally prevents rotation of said support member about a horizontal I axis.

11. The adjustable hitch assembly of claim 1, wherein the opening is defined by a discontinuous peripheral wall.

12. The adjustable hitch assembly of claim 1, wherein the opening is either a generally C-shape or U-shape.

13. An adjustable hitch assembly comprising:
a vehicle attachment member;
a shank extending vertically from and connected with said vehicle attachment member, said shank having a length;
a guide member positioned in and extending at least a portion of said length of said shank, said guide member extending inward on at least one side of said shank;
a support member comprising an opening to selectively attached to said support member to said shank through said opening and generally circumscribing said shank, said support member having a height; and
an engaging member attached to said support member and extending substantially said height of said support member, said engaging member extending with said opening of said support member, wherein said engaging member is inserted within and engages with said guide member upon selective attachment of said support member with said shank generally preventing rotation of said support member relative to said shank.

14. The adjustable hitch assembly of claim 13, wherein said engaging member supports a moment force applied between said support member and said vehicle attachment member.

15. The adjustable hitch assembly of claim 13, wherein said engaging member extends said height of said support member.

16. The adjustable hitch assembly of claim 13, wherein said guide member includes at least one slot and first and second ends, whereby said support member is removable from both of said first and second ends.

17. The adjustable hitch assembly of claim 16, wherein said first and second ends are open.

18. The adjustable hitch assembly of claim 17, wherein said support member includes a generally open rear end.

19. The adjustable hitch assembly of claim 17, further comprising a second guide member positioned in and extending at least a portion of said length of said shank, said second guide member extending radially inward on one side of said shank opposite said guide member, wherein said second guide member includes open first and second ends.

20. The adjustable hitch assembly of claim 13, further comprising a pin member insertable into and through said shank and said support member securing said support member to said shank.

21. The adjustable hitch assembly of claim 13, wherein said guide member is positioned on an exterior of said shank.

22. An adjustable hitch assembly comprising:
a vehicle attachment member;
a shank extending vertically from and connected with said vehicle attachment member, said shank having a length;
a guide member positioned on and extending said length of said shank, said guide member having first and second ends;
a support member compromising an opening to selectively attach said support member to said shank through said opening and generally circumscribing said shank; and
an engaging member attached with said support member and extending within said opening of said support member for engaging into said guide member, wherein said support member is configured to be removed from said shank only at both of said first and second ends of said guide member.

23. The adjustable hitch assembly of claim 22, further comprising a second engaging member positioned within said opening generally opposite said engaging member.

24. The adjustable hitch assembly of claim 23, wherein said engaging and second engaging members support a moment force applied to said support member during operation.

25. The adjustable hitch assembly of claim 24, wherein said engaging and second engaging members support a longitudinal force applied to said support member during operation.

26. The adjustable hitch assembly of claim 25, wherein said engaging and second engaging members extend substantially a height of said support member.

27. The adjustable hitch assembly of claim 22, further comprising a pintle hook selectively attached to said support member.

28. The adjustable hitch assembly of claim 22, wherein said guide member is positioned on an exterior of said shank.

29. An adjustable hitch assembly comprising:
a vehicle attachment member;
a shank extending vertically from and connected with said vehicle attachment member, said shank having a length;
a guide member positioned on and extending said length of said shank, said guide member having first and second ends;
a support member selectively attached to said shank, wherein said support member includes an opening, whereby said support member is selectively attachable to said shank through said opening; and
an engaging member attached with said support member and positioned within said opening for engaging into said guide member, wherein said support member is configured to be removed from said shank only at both of said first and second ends of said guide member.

* * * * *